United States Patent
Lydon et al.

(10) Patent No.: US 8,208,853 B2
(45) Date of Patent: Jun. 26, 2012

(54) ACCESSORY DEVICE AUTHENTICATION

(75) Inventors: Gregory T. Lydon, Santa Cruz, CA (US); Emily Clark Schubert, San Jose, CA (US)

(73) Assignee: Apple Inc., Cupertino, CA (US)

( * ) Notice: Subject to any disclaimer, the term of this patent is extended or adjusted under 35 U.S.C. 154(b) by 389 days.

(21) Appl. No.: 12/556,507

(22) Filed: Sep. 9, 2009

(65) Prior Publication Data
US 2010/0075604 A1    Mar. 25, 2010

Related U.S. Application Data

(63) Continuation-in-part of application No. 12/349,984, filed on Jan. 7, 2009.

(60) Provisional application No. 61/095,041, filed on Sep. 8, 2009.

(51) Int. Cl.
H04B 7/00    (2006.01)

(52) U.S. Cl. ................. 455/41.2; 455/556.1; 455/575.7; 361/683

(58) Field of Classification Search ................. 455/41.2, 455/556.1, 575.7, 553.1, 552.1; 361/683, 361/753
See application file for complete search history.

(56) References Cited

U.S. PATENT DOCUMENTS

| | | |
|---|---|---|
| 4,673,861 A | 6/1987 | Dubovsky et al. |
| 4,850,899 A | 7/1989 | Maynard |
| 4,916,334 A | 4/1990 | Minagawa et al. |
| 4,924,216 A | 5/1990 | Leung |
| 4,938,483 A | 7/1990 | Yavetz |
| 5,041,025 A | 8/1991 | Haitmanek |
| 5,051,606 A | 9/1991 | Ikehara |
| 5,055,069 A | 10/1991 | Townsend et al. |
| 5,080,603 A | 1/1992 | Mouissie |
| 5,104,243 A | 4/1992 | Harding |
| 5,108,313 A | 4/1992 | Adams |
| 5,150,031 A | 9/1992 | James et al. |
| 5,186,646 A | 2/1993 | Pederson |

(Continued)

FOREIGN PATENT DOCUMENTS

EP    1104150 A2    5/2001

(Continued)

OTHER PUBLICATIONS

Anonymous, "Future of Digital Music in Windows," Microsoft Windows Hardware Developer Central Archive, Dec. 4, 2001[Online], [retrieved on Jan. 15, 2008]. <URL:http://www.microsoft.com/whdc/archive/digitaudio.mspx> (3 pages).

(Continued)

*Primary Examiner* — Minh D Dao
(74) *Attorney, Agent, or Firm* — Kilpatrick Townsend & Stockton LLP

(57) ABSTRACT

An authentication controller coupled to a first communication port of a portable computing device is allowed to provide authentication on behalf of an accessory device coupled to a second communication port of the portable computing device. In one embodiment, a dongle that includes an authentication controller can be coupled with the portable computing device. Accessory devices can also be coupled with the portable computing device through other ports, including wireless ports. The dongle can provide cross-transport authentication for accessories that do not include authentication controllers. Once the dongle had been properly authenticated, the permissions granted to the dongle port can be transferred to a communication port coupled with an accessory.

24 Claims, 20 Drawing Sheets

U.S. PATENT DOCUMENTS

| | | | |
|---|---|---|---|
| 5,247,138 A | 9/1993 | Landmeier |
| 5,277,624 A | 1/1994 | Champion |
| 5,471,128 A | 11/1995 | Patino et al. |
| 5,525,981 A | 6/1996 | Abernethy |
| 5,546,397 A * | 8/1996 | Mahany | 370/310 |
| 5,586,893 A | 12/1996 | Mosquera |
| 5,592,588 A | 1/1997 | Reekes et al. |
| 5,618,045 A | 4/1997 | Kagan et al. |
| 5,648,712 A | 7/1997 | Hahn |
| 5,660,558 A | 8/1997 | Osanai et al. |
| 5,675,467 A | 10/1997 | Nishimura et al. |
| 5,727,866 A | 3/1998 | Kraines et al. |
| 5,732,361 A | 3/1998 | Liu |
| 5,754,027 A | 5/1998 | Oglesbee et al. |
| 5,830,001 A | 11/1998 | Kinoshita |
| 5,835,862 A | 11/1998 | Nykanen et al. |
| 5,845,217 A | 12/1998 | Lindell et al. |
| 5,859,522 A | 1/1999 | Theobald |
| 5,884,323 A | 3/1999 | Hawkins et al. |
| 5,901,049 A | 5/1999 | Schmidt et al. |
| 5,949,877 A | 9/1999 | Traw et al. |
| 5,964,847 A | 10/1999 | Booth, III et al. |
| 5,975,957 A | 11/1999 | Noda et al. |
| 5,991,640 A | 11/1999 | Lilja et al. |
| 6,007,372 A | 12/1999 | Wood |
| 6,012,105 A | 1/2000 | Rubbmark et al. |
| 6,031,797 A | 2/2000 | Van Ryzin et al. |
| 6,053,773 A | 4/2000 | Wu |
| 6,078,402 A | 6/2000 | Fischer et al. |
| 6,078,789 A | 6/2000 | Bodenmann et al. |
| 6,125,455 A | 9/2000 | Yeo |
| 6,130,518 A | 10/2000 | Gabehart et al. |
| 6,139,373 A | 10/2000 | Ward et al. |
| 6,154,773 A | 11/2000 | Roberts et al. |
| 6,154,798 A | 11/2000 | Lin et al. |
| 6,161,027 A | 12/2000 | Poirel |
| 6,169,387 B1 | 1/2001 | Kaib |
| 6,175,358 B1 | 1/2001 | Scott-Jackson et al. |
| 6,178,514 B1 | 1/2001 | Wood |
| 6,184,652 B1 | 2/2001 | Yang |
| 6,184,655 B1 | 2/2001 | Malackowski |
| 6,188,265 B1 | 2/2001 | Liu et al. |
| 6,192,340 B1 | 2/2001 | Abecassis |
| 6,203,345 B1 | 3/2001 | Roque et al. |
| 6,204,637 B1 | 3/2001 | Rengan |
| 6,206,480 B1 | 3/2001 | Thompson |
| 6,211,581 B1 | 4/2001 | Farrant |
| 6,211,649 B1 | 4/2001 | Matsuda |
| 6,224,420 B1 | 5/2001 | Nishio et al. |
| 6,230,205 B1 | 5/2001 | Garrity et al. |
| 6,230,322 B1 | 5/2001 | Saib et al. |
| 6,234,827 B1 | 5/2001 | Nishio et al. |
| 6,236,395 B1 | 5/2001 | Sezan et al. |
| 6,247,135 B1 | 6/2001 | Feague |
| 6,252,380 B1 | 6/2001 | Koenck |
| 6,255,961 B1 | 7/2001 | Van Ryzin et al. |
| 6,261,109 B1 | 7/2001 | Liu et al. |
| 6,262,723 B1 | 7/2001 | Matsuzawa et al. |
| 6,267,623 B1 | 7/2001 | Hisamatsu |
| 6,268,845 B1 | 7/2001 | Pariza et al. |
| 6,271,605 B1 | 8/2001 | Carkner et al. |
| 6,272,328 B1 | 8/2001 | Nguyen et al. |
| 6,280,251 B1 | 8/2001 | Nishio et al. |
| 6,283,789 B1 | 9/2001 | Tsai |
| 6,304,764 B1 | 10/2001 | Pan |
| 6,314,326 B1 | 11/2001 | Fuchu |
| 6,314,479 B1 | 11/2001 | Frederick et al. |
| 6,316,916 B2 | 11/2001 | Bohne |
| 6,319,061 B1 | 11/2001 | Chen et al. |
| 6,322,396 B1 | 11/2001 | Kuan |
| 6,336,365 B1 | 1/2002 | Blackadar et al. |
| 6,344,727 B1 | 2/2002 | Desai et al. |
| 6,353,894 B1 | 3/2002 | Pione |
| 6,354,713 B1 | 3/2002 | Leifer et al. |
| 6,358,089 B1 | 3/2002 | Kuroda et al. |
| 6,372,974 B1 | 4/2002 | Gross et al. |
| 6,377,825 B1 | 4/2002 | Kennedy et al. |
| 6,385,596 B1 | 5/2002 | Wiser et al. |
| 6,394,905 B1 | 5/2002 | Takeda et al. |
| 6,418,421 B1 | 7/2002 | Hurtado et al. |
| 6,429,622 B1 | 8/2002 | Svensson |
| 6,429,879 B1 | 8/2002 | Sturgeon et al. |
| 6,431,915 B1 | 8/2002 | Ko |
| 6,453,371 B1 | 9/2002 | Hampson et al. |
| 6,454,592 B2 | 9/2002 | Takagi |
| 6,461,173 B1 | 10/2002 | Mizuno et al. |
| 6,464,542 B1 | 10/2002 | Lee |
| 6,468,110 B2 | 10/2002 | Fujino et al. |
| 6,476,825 B1 | 11/2002 | Croy et al. |
| 6,478,603 B1 | 11/2002 | Wu |
| 6,483,428 B1 | 11/2002 | Fish et al. |
| 6,485,328 B1 | 11/2002 | Wu |
| 6,489,751 B2 | 12/2002 | Small et al. |
| 6,501,441 B1 | 12/2002 | Ludtke et al. |
| 6,505,160 B1 | 1/2003 | Levy et al. |
| 6,524,119 B2 | 2/2003 | Kato et al. |
| 6,526,287 B1 | 2/2003 | Lee |
| 6,535,981 B1 | 3/2003 | Shimizu |
| 6,535,983 B1 | 3/2003 | McCormack et al. |
| 6,558,201 B1 | 5/2003 | Begley et al. |
| 6,559,773 B1 | 5/2003 | Berry |
| 6,577,877 B1 | 6/2003 | Charlier et al. |
| 6,589,076 B1 | 7/2003 | Davis et al. |
| 6,591,085 B1 | 7/2003 | Grady |
| 6,608,264 B1 | 8/2003 | Fouladpour |
| 6,608,399 B2 | 8/2003 | McConnell et al. |
| 6,614,232 B1 | 9/2003 | Mukai |
| 6,616,473 B2 | 9/2003 | Kamata et al. |
| 6,629,197 B1 | 9/2003 | Bhogal et al. |
| 6,642,629 B2 | 11/2003 | DeLeeuw |
| 6,643,777 B1 | 11/2003 | Chu |
| 6,650,549 B1 * | 11/2003 | Chiao | 361/785 |
| 6,651,138 B2 | 11/2003 | Lai et al. |
| 6,653,813 B2 | 11/2003 | Khatri |
| 6,663,420 B1 | 12/2003 | Xiao |
| 6,665,803 B2 | 12/2003 | Lunsford et al. |
| 6,670,997 B1 | 12/2003 | Nortrup |
| 6,674,995 B1 | 1/2004 | Meyers et al. |
| 6,687,454 B1 | 2/2004 | Kuroiwa |
| 6,697,944 B1 | 2/2004 | Jones et al. |
| 6,708,283 B1 | 3/2004 | Nelvin et al. |
| 6,724,339 B2 | 4/2004 | Conway et al. |
| 6,725,061 B1 | 4/2004 | Hutchison, IV et al. |
| 6,728,546 B1 | 4/2004 | Peterson et al. |
| 6,728,729 B1 | 4/2004 | Jawa et al. |
| 6,747,859 B2 | 6/2004 | Walbeck et al. |
| 6,754,468 B1 | 6/2004 | Sieben et al. |
| 6,761,635 B2 | 7/2004 | Hoshino et al. |
| 6,774,939 B1 | 8/2004 | Peng |
| 6,776,626 B2 | 8/2004 | Huang et al. |
| 6,776,660 B1 | 8/2004 | Kubota et al. |
| 6,776,665 B2 | 8/2004 | Huang |
| 6,799,226 B1 | 9/2004 | Robbin et al. |
| 6,801,964 B1 | 10/2004 | Mahdavi |
| 6,813,528 B1 | 11/2004 | Yang |
| 6,816,376 B2 | 11/2004 | Bright et al. |
| 6,830,160 B2 | 12/2004 | Risolia |
| 6,859,538 B1 | 2/2005 | Voltz |
| 6,859,854 B2 | 2/2005 | Kwong |
| 6,870,733 B2 * | 3/2005 | Castell et al. | 361/679.56 |
| 6,879,843 B1 | 4/2005 | Kim |
| 6,928,295 B2 | 8/2005 | Olson et al. |
| 6,931,266 B2 | 8/2005 | Miyoshi et al. |
| 6,931,456 B2 | 8/2005 | Payne et al. |
| 6,939,177 B2 | 9/2005 | Kato et al. |
| 6,944,704 B2 | 9/2005 | Brelin |
| 6,991,483 B1 | 1/2006 | Milan et al. |
| 7,004,787 B2 | 2/2006 | Milan |
| 7,006,793 B2 | 2/2006 | Himmel et al. |
| 7,013,164 B2 | 3/2006 | Lin |
| 7,040,919 B2 | 5/2006 | Yao |
| 7,046,230 B2 | 5/2006 | Zadesky |
| 7,050,783 B2 | 5/2006 | Curtiss et al. |
| 7,054,888 B2 | 5/2006 | LaChapelle et al. |
| 7,062,261 B2 | 6/2006 | Goldstein et al. |
| 7,108,560 B1 | 9/2006 | Chou et al. |
| 7,120,462 B2 | 10/2006 | Kumar |

| | | | |
|---|---|---|---|
| 7,127,678 B2 | 10/2006 | Bhesania et al. | |
| 7,127,879 B2 | 10/2006 | Zhu et al. | |
| 7,149,543 B2 | 12/2006 | Kumar | |
| 7,155,545 B1 | 12/2006 | Wang | |
| 7,167,112 B2 | 1/2007 | Andersen et al. | |
| 7,167,935 B2 | 1/2007 | Hellberg | |
| 7,187,947 B1 | 3/2007 | White et al. | |
| 7,187,948 B2 | 3/2007 | Alden | |
| 7,215,042 B2 | 5/2007 | Yan | |
| 7,281,214 B2 | 10/2007 | Fadell | |
| 7,293,122 B1 | 11/2007 | Schubert et al. | |
| 7,293,227 B2 | 11/2007 | Plastina et al. | |
| 7,299,304 B2 | 11/2007 | Saint-Hilaire et al. | |
| 7,303,282 B2 | 12/2007 | Dwyer et al. | |
| 7,304,685 B2 | 12/2007 | Park et al. | |
| 7,305,254 B2 | 12/2007 | Findikli | |
| 7,305,506 B1 | 12/2007 | Lydon et al. | |
| 7,322,043 B2 | 1/2008 | Letsinger | |
| 7,324,833 B2 | 1/2008 | White et al. | |
| 7,362,963 B2 | 4/2008 | Lin | |
| 7,363,129 B1 | 4/2008 | Barnicle et al. | |
| 7,391,963 B2 | 6/2008 | Chen et al. | |
| 7,415,563 B1 | 8/2008 | Holden et al. | |
| 7,441,058 B1 | 10/2008 | Bolton et al. | |
| 7,441,062 B2 | 10/2008 | Novotney et al. | |
| 7,444,388 B1 | 10/2008 | Svendsen | |
| 7,450,961 B1 | 11/2008 | Heubel et al. | |
| 7,454,019 B2 | 11/2008 | Williams | |
| 7,493,645 B1 | 2/2009 | Tranchina | |
| 7,526,588 B1 | 4/2009 | Schubert et al. | |
| 7,529,870 B1 | 5/2009 | Schubert et al. | |
| 7,529,871 B1 | 5/2009 | Schubert et al. | |
| 7,529,872 B1 | 5/2009 | Schubert et al. | |
| 7,558,894 B1 | 7/2009 | Lydon et al. | |
| 7,587,540 B2 | 9/2009 | Novotney et al. | |
| 7,590,783 B2 | 9/2009 | Lydon et al. | |
| 7,610,350 B2 | 10/2009 | Abdulrahiman et al. | |
| 7,634,605 B2 | 12/2009 | Laefer et al. | |
| 7,647,129 B1 | 1/2010 | Griffin | |
| 7,660,929 B2 | 2/2010 | Novotney et al. | |
| 7,670,263 B2 | 3/2010 | Ellis et al. | |
| 7,673,020 B2 | 3/2010 | Rosenbloom et al. | |
| 7,673,083 B2 | 3/2010 | Laefer et al. | |
| 7,680,849 B2 | 3/2010 | Heller et al. | |
| 7,681,033 B2 | 3/2010 | Miura et al. | |
| 7,702,833 B2 | 4/2010 | Novotney et al. | |
| 7,757,026 B2 | 7/2010 | Novotney et al. | |
| 7,779,185 B2 | 8/2010 | Schubert et al. | |
| 7,791,319 B2 | 9/2010 | Veselic et al. | |
| 7,797,471 B2 | 9/2010 | Laefer et al. | |
| 7,823,214 B2 | 10/2010 | Rubinstein et al. | |
| 7,836,493 B2 | 11/2010 | Xia et al. | |
| 7,853,746 B2 | 12/2010 | Novotney et al. | |
| 7,877,532 B2 | 1/2011 | Schubert et al. | |
| 8,073,426 B2 * | 12/2011 | Ishikawa | 455/410 |
| 2001/0003205 A1 | 6/2001 | Gilbert | |
| 2001/0005641 A1 | 6/2001 | Matsumoto et al. | |
| 2001/0006884 A1 | 7/2001 | Matsumoto | |
| 2001/0042107 A1 | 11/2001 | Palm | |
| 2002/0002035 A1 | 1/2002 | Sim et al. | |
| 2002/0010759 A1 | 1/2002 | Hitson et al. | |
| 2002/0015362 A1 | 2/2002 | Cowgill et al. | |
| 2002/0025042 A1 | 2/2002 | Saito | |
| 2002/0029303 A1 | 3/2002 | Nguyen | |
| 2002/0065074 A1 | 5/2002 | Cohn et al. | |
| 2002/0068610 A1 | 6/2002 | Anvekar et al. | |
| 2002/0072390 A1 | 6/2002 | Uchiyama | |
| 2002/0103008 A1 | 8/2002 | Rahn et al. | |
| 2002/0105861 A1 | 8/2002 | Leapman | |
| 2002/0108108 A1 | 8/2002 | Akaiwa et al. | |
| 2002/0115426 A1 | 8/2002 | Olson et al. | |
| 2002/0115480 A1 | 8/2002 | Huang | |
| 2002/0116533 A1 | 8/2002 | Holliman et al. | |
| 2002/0120850 A1 | 8/2002 | Walker et al. | |
| 2002/0132651 A1 | 9/2002 | Jinnouchi | |
| 2002/0151327 A1 | 10/2002 | Levitt | |
| 2002/0152874 A1 | 10/2002 | Vilcauskas et al. | |
| 2002/0156546 A1 | 10/2002 | Ramaswamy | |
| 2002/0156949 A1 | 10/2002 | Kubo et al. | |
| 2002/0161865 A1 | 10/2002 | Nguyen | |
| 2002/0173273 A1 | 11/2002 | Spurgat et al. | |
| 2002/0174269 A1 | 11/2002 | Spurgat et al. | |
| 2002/0194621 A1 | 12/2002 | Tran et al. | |
| 2003/0004934 A1 | 1/2003 | Qian | |
| 2003/0011608 A1 | 1/2003 | Wada | |
| 2003/0028664 A1 | 2/2003 | Tan et al. | |
| 2003/0041206 A1 | 2/2003 | Dickie | |
| 2003/0059022 A1 | 3/2003 | Nebiker et al. | |
| 2003/0067741 A1 | 4/2003 | Alfonso et al. | |
| 2003/0073432 A1 | 4/2003 | Meade | |
| 2003/0079038 A1 | 4/2003 | Robbin et al. | |
| 2003/0090988 A1 | 5/2003 | Sun et al. | |
| 2003/0097379 A1 | 5/2003 | Ireton | |
| 2003/0110403 A1 | 6/2003 | Crutchfield et al. | |
| 2003/0151621 A1 | 8/2003 | McEvilly et al. | |
| 2003/0167318 A1 | 9/2003 | Robbin et al. | |
| 2003/0172209 A1 | 9/2003 | Liu et al. | |
| 2003/0185395 A1 | 10/2003 | Lee et al. | |
| 2003/0198015 A1 | 10/2003 | Vogt | |
| 2003/0212895 A1 | 11/2003 | Kisliakov | |
| 2003/0215102 A1 | 11/2003 | Marlowe | |
| 2003/0220988 A1 | 11/2003 | Hymel | |
| 2003/0236075 A1 | 12/2003 | Johnson et al. | |
| 2003/0236991 A1 | 12/2003 | Letsinger | |
| 2003/0236998 A1 | 12/2003 | Gilstrap et al. | |
| 2003/0237043 A1 | 12/2003 | Novak et al. | |
| 2004/0003300 A1 | 1/2004 | Malueg et al. | |
| 2004/0019497 A1 | 1/2004 | Volk et al. | |
| 2004/0039860 A1 | 2/2004 | Mills et al. | |
| 2004/0048569 A1 | 3/2004 | Kawamura | |
| 2004/0055446 A1 | 3/2004 | Robbin et al. | |
| 2004/0090998 A1 | 5/2004 | Chen | |
| 2004/0103223 A1 | 5/2004 | Gabehart et al. | |
| 2004/0116005 A1 | 6/2004 | Choi | |
| 2004/0125553 A1 * | 7/2004 | Castell et al. | 361/683 |
| 2004/0151327 A1 | 8/2004 | Marlowe | |
| 2004/0152439 A1 | 8/2004 | Kimura et al. | |
| 2004/0162029 A1 | 8/2004 | Grady | |
| 2004/0162105 A1 * | 8/2004 | Reddy et al. | 455/551 |
| 2004/0164708 A1 | 8/2004 | Veselic et al. | |
| 2004/0172533 A1 | 9/2004 | DeMello et al. | |
| 2004/0186935 A1 | 9/2004 | Bel et al. | |
| 2004/0194154 A1 | 9/2004 | Meadors et al. | |
| 2004/0198436 A1 | 10/2004 | Alden | |
| 2004/0224638 A1 | 11/2004 | Fadell et al. | |
| 2004/0235339 A1 | 11/2004 | Sato et al. | |
| 2004/0249994 A1 | 12/2004 | Shapiro et al. | |
| 2004/0252966 A1 | 12/2004 | Holloway et al. | |
| 2004/0267812 A1 | 12/2004 | Harris et al. | |
| 2004/0267825 A1 | 12/2004 | Novak et al. | |
| 2004/0268397 A1 | 12/2004 | Dunbar et al. | |
| 2005/0001589 A1 | 1/2005 | Edington et al. | |
| 2005/0005133 A1 | 1/2005 | Xia et al. | |
| 2005/0014119 A1 | 1/2005 | Rudakov | |
| 2005/0014531 A1 | 1/2005 | Findikli | |
| 2005/0014536 A1 | 1/2005 | Grady | |
| 2005/0015355 A1 | 1/2005 | Heller et al. | |
| 2005/0018768 A1 | 1/2005 | Mabey et al. | |
| 2005/0022212 A1 | 1/2005 | Bowen | |
| 2005/0047071 A1 | 3/2005 | Tse Chun Hin | |
| 2005/0080915 A1 | 4/2005 | Shoemaker et al. | |
| 2005/0111675 A1 | 5/2005 | Lee | |
| 2005/0135790 A1 | 6/2005 | Hutten | |
| 2005/0138433 A1 | 6/2005 | Linetsky | |
| 2005/0149213 A1 | 7/2005 | Guzak et al. | |
| 2005/0181756 A1 | 8/2005 | Lin | |
| 2005/0198189 A1 | 9/2005 | Robinson et al. | |
| 2005/0207726 A1 | 9/2005 | Chen | |
| 2005/0227612 A1 | 10/2005 | Helstrom et al. | |
| 2005/0239333 A1 | 10/2005 | Watanabe et al. | |
| 2005/0240705 A1 | 10/2005 | Novotney et al. | |
| 2005/0246375 A1 | 11/2005 | Manders et al. | |
| 2005/0251565 A1 | 11/2005 | Weel | |
| 2005/0281185 A1 | 12/2005 | Kawasaki | |
| 2006/0015826 A1 | 1/2006 | Shiozawa et al. | |
| 2006/0031545 A1 | 2/2006 | Manders et al. | |
| 2006/0056796 A1 | 3/2006 | Nishizawa et al. | |
| 2006/0072527 A1 | 4/2006 | Beck | |

| | | | |
|---|---|---|---|
| 2006/0088228 A1 | 4/2006 | Marriott et al. | |
| 2006/0116009 A1 | 6/2006 | Langberg et al. | |
| 2006/0143680 A1 | 6/2006 | Adachi | |
| 2006/0156415 A1 | 7/2006 | Rubinstein et al. | |
| 2006/0161621 A1 | 7/2006 | Rosenberg | |
| 2006/0163358 A1 | 7/2006 | Biderman | |
| 2006/0168298 A1 | 7/2006 | Aoki et al. | |
| 2006/0184456 A1 | 8/2006 | de Janasz | |
| 2006/0188237 A1 | 8/2006 | Watanabe et al. | |
| 2006/0205349 A1 | 9/2006 | Passier et al. | |
| 2006/0224620 A1 | 10/2006 | Silverman et al. | |
| 2006/0236245 A1 | 10/2006 | Agarwal et al. | |
| 2006/0247851 A1 | 11/2006 | Morris | |
| 2006/0258289 A1 | 11/2006 | Dua | |
| 2006/0277555 A1 | 12/2006 | Howard | |
| 2006/0294209 A1 | 12/2006 | Rosenbloom et al. | |
| 2007/0011138 A1 | 1/2007 | Boucard | |
| 2007/0018947 A1 | 1/2007 | Toro-Lira | |
| 2007/0056012 A1 | 3/2007 | Kwon et al. | |
| 2007/0056013 A1 | 3/2007 | Duncan | |
| 2007/0070856 A1 | 3/2007 | Tebele | |
| 2007/0077784 A1 | 4/2007 | Kalayjian et al. | |
| 2007/0080823 A1 | 4/2007 | Fu et al. | |
| 2007/0083750 A1 | 4/2007 | Miura et al. | |
| 2007/0083814 A1 | 4/2007 | Wilbrink et al. | |
| 2007/0086724 A1 | 4/2007 | Grady et al. | |
| 2007/0106760 A1 | 5/2007 | Houh et al. | |
| 2007/0130592 A1 | 6/2007 | Haeusel | |
| 2007/0173197 A1 | 7/2007 | Hsiung | |
| 2007/0173294 A1 | 7/2007 | Hsiung | |
| 2007/0206827 A1 | 9/2007 | Tupman et al. | |
| 2007/0209081 A1 | 9/2007 | Morris | |
| 2007/0226238 A1 | 9/2007 | Kiilerich et al. | |
| 2007/0226384 A1 | 9/2007 | Robbin et al. | |
| 2007/0230910 A1 | 10/2007 | Welch et al. | |
| 2007/0233294 A1 | 10/2007 | Holden et al. | |
| 2007/0233295 A1 | 10/2007 | Laefer et al. | |
| 2007/0234420 A1 | 10/2007 | Novotney et al. | |
| 2007/0236482 A1 | 10/2007 | Proctor et al. | |
| 2007/0244984 A1 | 10/2007 | Svendsen | |
| 2007/0247794 A1 | 10/2007 | Jaffe et al. | |
| 2007/0291404 A1 | 12/2007 | Morse et al. | |
| 2007/0300155 A1 | 12/2007 | Laefer et al. | |
| 2008/0025172 A1 | 1/2008 | Holden et al. | |
| 2008/0034325 A1 | 2/2008 | Ording | |
| 2008/0055272 A1 | 3/2008 | Anzures et al. | |
| 2008/0065722 A1 | 3/2008 | Brodersen et al. | |
| 2008/0188209 A1 | 8/2008 | Dorogusker et al. | |
| 2008/0243282 A1 | 10/2008 | Koski et al. | |
| 2009/0013110 A1 | 1/2009 | Novotney et al. | |
| 2009/0013253 A1 | 1/2009 | Laefer et al. | |
| 2009/0125134 A1 | 5/2009 | Bolton et al. | |
| 2009/0132076 A1 | 5/2009 | Holden et al. | |
| 2009/0198361 A1 | 8/2009 | Schubert et al. | |
| 2009/0204244 A1 | 8/2009 | Schubert et al. | |
| 2009/0204738 A1 | 8/2009 | Schubert et al. | |
| 2009/0210079 A1 | 8/2009 | Schubert et al. | |
| 2009/0249101 A1 | 10/2009 | Lydon et al. | |
| 2009/0292835 A1 | 11/2009 | Novotney et al. | |
| 2009/0299506 A1 | 12/2009 | Lydon et al. | |
| 2010/0009660 A1* | 1/2010 | Ishikawa | 455/411 |
| 2010/0049350 A1 | 2/2010 | Laefer et al. | |
| 2010/0106879 A1 | 4/2010 | Laefer et al. | |
| 2010/0173673 A1 | 7/2010 | Lydon et al. | |
| 2011/0078354 A1 | 3/2011 | Krueger et al. | |

FOREIGN PATENT DOCUMENTS

| | | | |
|---|---|---|---|
| EP | 1150472 A2 | 10/2001 | |
| EP | 1367734 A1 | 12/2003 | |
| EP | 1498899 A1 | 1/2005 | |
| EP | 1594319 A1 | 11/2005 | |
| EP | 1672613 A2 | 6/2006 | |
| GB | 2405718 A | 3/2005 | |
| JP | 07-176351 A | 7/1995 | |
| JP | 10-321302 A | 4/1998 | |
| JP | 10-334993 A | 12/1998 | |
| JP | 11-288420 A | 10/1999 | |
| JP | 2000-214953 A | 8/2000 | |
| JP | 2000-223215 A | 8/2000 | |
| JP | 2000-223216 A | 8/2000 | |
| JP | 2000-223218 A | 8/2000 | |
| JP | 2001-035603 A | 2/2001 | |
| JP | 2001-069165 A | 3/2001 | |
| JP | 2001-196133 A | 7/2001 | |
| JP | 2001-230021 A | 8/2001 | |
| JP | 2001-332350 A | 11/2001 | |
| JP | 2002-025720 A | 1/2002 | |
| JP | 2002-140304 A | 5/2002 | |
| JP | 2002-203641 A | 7/2002 | |
| JP | 2002-245719 A | 8/2002 | |
| JP | 2002-252566 A | 9/2002 | |
| JP | 3090747 U | 10/2002 | |
| JP | 2002-342659 A | 11/2002 | |
| JP | 2002-374447 A | 12/2002 | |
| JP | 2003-017165 A | 1/2003 | |
| JP | 2003-032351 A | 1/2003 | |
| JP | 2003-058430 A | 2/2003 | |
| JP | 2003-274386 A | 9/2003 | |
| JP | 2004-078538 A | 3/2004 | |
| JP | 2004-259280 A | 9/2004 | |
| JP | 2008053955 A | 3/2008 | |
| JP | 2008071419 A | 3/2008 | |
| JP | 2009303001 A | 12/2009 | |
| TW | 530267 | 5/2003 | |
| WO | WO 99/26330 A2 | 5/1999 | |
| WO | WO 99/48089 A2 | 9/1999 | |
| WO | WO 03056776 A1 | 9/1999 | |
| WO | WO 00/39907 A2 | 7/2000 | |
| WO | WO 00/60450 A1 | 10/2000 | |
| WO | WO 02/49314 A2 | 6/2002 | |
| WO | WO 03/036541 A1 | 5/2003 | |
| WO | WO 03/036957 A1 | 5/2003 | |
| WO | WO 03/073688 A1 | 9/2003 | |
| WO | WO 2004/084413 A2 | 9/2004 | |
| WO | WO 2004-095772 A1 | 11/2004 | |
| WO | WO 2004/098079 A1 | 11/2004 | |
| WO | WO 2004/112311 A1 | 12/2004 | |
| WO | WO 2005/109781 A1 | 11/2005 | |
| WO | WO 2005/119463 A2 | 12/2005 | |
| WO | WO 2006/071364 A1 | 6/2006 | |
| WO | WO 2006/073702 A1 | 7/2006 | |
| WO | WO 2006/080957 A2 | 8/2006 | |
| WO | WO 2007/139660 A2 | 12/2007 | |
| WO | WO 2011/031760 A1 | 3/2011 | |

OTHER PUBLICATIONS

Anonymous, "Introduction to Digital Audio," Microsoft Windows Hardware Developer Central Archive, Dec. 4, 2001 [Online], [retrieved on Jan. 15, 2008]. <URL:http://www.microsoft.com/whdc/archive/digitaudio.mspx>. (2 pages).

Anonymous, "Windows and Red Book Audio," Microsoft Windows Hardware Developer Central Archive, Dec. 4, 2001 [Online], [retrieved Jan. 15, 2008]. <URL:http://www.microsoft.com/whdc/archive/Dmfuture.mspx> (2 pages).

"A Serial Bus on Speed Diagram: Getting Connected with FireWire," downloaded Oct. 16, 2001, PC Magazine: PC Tech (A Serial Bus on Speed) wysiwyg://51http://www.zdnet.com/pctech/content/18/10/tu1810.007.html p. 7. (2 pages).

Belkin iPod Voice Recorder, Product Specification Sheet, printed Jun. 16, 2004. (2 pages).

Bindra, "Standard Turns Monitor into I/O Hub," Electronic Engineering Times, vol. 918, Sep. 6, 1996, p. 14 (1 page).

Brentrup, "Introduction to Public Key Cryptography Demystified," Campus Technology, printed from http://www.campus-technology.com/article.asp?id=7626 on Oct. 6, 2004. (5 pages).

Brown, "Making USB Work," downloaded Oct. 16, 2001, PC Magazine: PC Tech wysiwyq:/155/http://www.zdnet.com/pcmag/pctech/content!18/04/tu1804.001.html (2 pages).

"Cables to Go," download Oct. 16, 2001 http://www.cablestogo.com/productasp?cat%5Fid=601&sku=27028 (1 page).

Chen et al., "Design and Implemeation of a Hard Disk-Based Entertainment Device for Managing Media Contents On the Go," Consumer Electonics, 1005. (ISCE 2005). Proceedings of the Ninth International Symposium on, pp. 328-333, Jun. 14-16, 2005. (6 pages).

Crawford et al., "Sample rate conversion and bit rate reduction in the studio," IEEE Colloquium on Digital Audio Signal Processing, May 22, 1991, pp. 8/1-8/3. (3 pages).

Derman, "Monitors Make Net Connections," Electronic Engineering Times, vol. 933, 1996, pp. 60 and 69.

"FireWire", downloaded Oct. 16,2001; si wyg:/ /4_2/http://developer.apple.com/hardware/Fire_Wire (2 pages).

"Fire Wire Connector," downloaded Oct. 16, 2001, wysiwyg://76/http://developer.apple.com/...es/Macintosh_CPUs-G3/ibook/ibook-27.html. (2 pages).

Fried, "FireWire poised to become ubiquitous," downloaded Oct. 16, 2001, CNET News.com, 1394 Trade Association: Press, wysiwyg:/132/http:/_113_94ta.org/Press/2001 Press/august!8.27.b.html (5 pages).

Fried, "New Fire Wire to blaze faster trail," downloaded Oct. 16, 2001, CNET News.com, http://news.cnet.com/news/0-I006-200-6021210.html (5 pages).

"How to Connect Your Computer PC Hardware", downloaded Oct. 16, 2001, http:///www.scar.utoronto.ca!~ccweb/faculty/connect-howto.html (5 pages).

"IEEE 1394/USB Comparison," downloaded Oct. 16, 2001, vvww.genitech.com.aulLIBRARY/TechSupportiinfobits/firewirevsusb.html (4 pages).

"Introduction to Public Key Cryptography," Oct. 9, 1998, printed from http://developer.netscape.com/docs/manuals/security/pkin/contents.html on Oct. 6, 2004. (21 pages).

iPod Classic User's Guide, acquired from apple.com, 2002 (44 pages).

iPod nano Features Guide, acquired from apple.com, 2008 (72 pages).

iPod touch User's Guide, acquired from apple.com, 2008 (120 pages).

"iPodDock/iPod Cradle," vvww.bookendzdocks.com/bookendz/dock_cradle.html downloaded Feb. 27, 2003 (2 pages).

Lambert, "Digital Audio Interfaces," Journal of the Audio Engineering Society, Audio Engineering Society, New York, NY, vol. 38, No. 9, (Sep. 1, 1990), pp. 681-684, 686, 688, 690, 692 and 696, XP000175146 ISSN: 1549-4950 figures 9, 10.

Lewis, "On Technology" Fortune Magazine, Dec. 9, 2002, p. 240.

LSI Logic's Broadcast PC Card Brings New Multimedia Capabilities to Personal Computing. (Nov. 16). PR Newswire, 1. Retrieved Jun. 26, 2010, from Business Dateline.

MAXTech Technology Ltd., CES 2000/Las Vegas, Jan. 6-9, 2000, [on line], [retrieved on Sep. 26, 2008]. Retrieved from the Internet <URL: http://web.archive.org/web/20000930170634/www.maxtech.com.hk/t-details.htm> (2 pages).

*MAXTech Technology Ltd., CES 2000*/Las Vegas, Jan. 6-9, 2000, [online], [retrieved on Sep. 23, 2008]. Retrieved from the Internet <URL: http://web.archive.org/web/20010223230441/www.maxtech.com.hk/g-p06.htm>. 2 pages.

Menezes et al., "Handbook of Applied Cryptography," *Identification and Entity Authentication*, Jan. 1, 1997, pp. 385-424. (41 pages).

Microsoft, "Media Transport Protocol Implementation Details," 2005 (18 pages).

"MPV™ Music Profile Specification Revision 1.00" Internet Citation [online] (Jan. 7, 2004) URL:http//www.osta.org/mpv/public/specs/MPVMusic-Prof-Spec-1.00.pdf> [retrieved Jun. 20, 2006] the whole document (70 pages).

"Neuros MP3 Digital Audio Computer," www.neurosaudio.com downloaded Apr. 9, 2003 (6 pages).

NOMAD II Player Version 1.0 (CLI) (User's Manual), Creative Technology, Ltd., Jan. 2000 (46 pages).

"PMC FW2 IEEE1394 FireWire Controller", downloaded Oct. 16, 2001 http://www.bymltd.co.uk/PMCfw2ds.html (10 pages).

Severance, "FireWire Finally Comes Home," Michigan State University, Standards, Nov. 1998, pp. 117-118 (2 pages).

Sinitsyn, "Synchronization Framework for Personal Mobile Servers," Pervasive Computing and Communications Workshops (PERCOMW'04), Proceedings of the Second IEEE Annual Conference, Piscataway, NJ, USA, IEEE, Mar. 14, 2004, pp. 208-212. (5 pages).

Slay et al., "iPod Forensics: Forencically Sound Examination of an Apple iPod," System Sciences, 2007. HICSS 2007. 40th Annual Hawaii Internation Conference on, pp. 1-9, Jan. 2007. (9 pages).

Teener, "Understanding Fire Wire: The IEEE 1394 Standards and Specifications," downloaded Oct. 16,2001, wysiwyg:119/http:1_Iwww.chipcenter.com/networking/ieee_1394/main.html (5 pages).

"The Authoritative Dictionary of IEEE Standards Terms, Seventh Edition," Published by Standards Information Network, IEEE Press, 2000. (3 pages).

"Universal Serial Bus Specification—Rev 2.0," *Chapter 6: Compaq Hewlett-Packard*, Apr. 27, 2000, pp. 85, 99-100. (3 pages).

Vitaliano, "Why FireWire is Hot!Hot!Hot!" downloaded Oct. 16, 2001, "Impact: FireWire.SideBar" http://www.vxm.com/21R.35.html (4 pages).

Whittle, "Public Key Authentication Framework: Tutorial," First Principles Consulting Jun. 2, 2004, downloaded Oct. 6, 2004, http://www.ozemail.com.au/~firstpr/cryoto/pkaftute.htm (7 pages).

International Search Report for PCT Patent Application No. PCT/US2010/048130 mailed on Dec. 21, 2010, 3 pages.

Office Communication and Examiner-Initiated Interview Summary of Oct. 19, 2011 for U.S. Appl. No. 12/349,984, 39 pages.

European Patent Office (EPO), Extended Search Report; Application No. 10194370.2, Mailed Feb. 6, 2012 (9 pages).

* cited by examiner

| PIN | Signal Name | I/O | Function |
|---|---|---|---|
| 1 | DGND | GND | Digital Ground |
| 2 | DGND | GND | Digital Ground |
| 3 | TPA+ | I/O | FireWire signal |
| 4 | USB D+ | I/O | USB signal |
| 5 | TPA- | I/O | FireWire signal |
| 6 | USB D- | I/O | USB signal |
| 7 | TPB+ | I/O | FireWire signal |
| 8 | USB PWR | I | USB power in; used to detect USB hub |
| 9 | TPB- | I/O | FireWire signal |
| 10 | Accessory Identify | I | Connection for accessory identification resistor |
| 11 | F/W PWR+ | I | Firewire and charger input power (8V to 15V dc) |
| 12 | F/W PWR+ | I | Firewire and charger input power (8V to 15V dc) |
| 13 | Accessory Pwr | O | Nominal 3.3V output; current limited to 100 mA |
| 14 | Reserved | | |
| 15 | DGND | GND | Digital Ground |
| 16 | DGND | GND | Digital Ground |
| 17 | Reserved | | |
| 18 | RX | I | Serial protocol input to media player |
| 19 | TX | O | Serial protocol output from media player |
| 20 | Accessory Detect | I | Connection for accessory identification resistor |
| 21 | S Video Y | O | Luminance component for S-video |
| 22 | S Video C | O | Chrominance component for S-video |
| 23 | Composite Video | O | Composite video signal |
| 24 | Remote sense | I | Detect remote |
| 25 | LINE-IN L | I | Line level input for left audio channel |
| 26 | LINE-IN R | I | Line level input for right audio channel |
| 27 | LINE-OUT L | O | Line level output to left audio channel |
| 28 | LINE-OUT R | O | Line level output to right audio channel |
| 29 | Audio Return | --- | Signal, not to be grounded in accessory |
| 30 | DGND | GND | Digital ground |
| 31 | Chassis | | Chassis ground for connector shell |
| 32 | Chassis | | Chassis ground for connector shell |

*FIG. 4*

ACCESSORY DEVICE AUTHENTICATION

CROSS-REFERENCES TO RELATED APPLICATIONS

This application is a Continuation-In-Part of U.S. patent application Ser. No. 12/349,984, entitled "Cross Transport Authentication," filed on Jan. 7, 2009, and assigned to the assignee of the present application, which is a non-provisional of U.S. Provisional Patent Application Ser. No. 61/095,041, entitled "Cross Transport Authentication," filed on Sep. 8, 2009, and assigned to the assignee of the present application.

FIELD OF THE INVENTION

The present invention relates generally to authentication and in particular to cross-transport authentication for use in communications between a portable media device and an accessory device.

BACKGROUND

A portable media device can store media assets, such as audio tracks, video tracks or photos that may be played or displayed on the portable media device. Examples of portable media devices are the iPod® and the iPhone™ portable media devices, which are available from Apple Inc. of Cupertino, Calif. Often, a portable media device acquires its media assets from a host computer that serves to enable a user to manage media assets. As an example, the host computer may execute a media management application to manage media assets. One example of a media management application is iTunes®, produced by Apple Inc.

A portable media device typically includes one or more connectors or ports that may be used to interface with other devices. For example, the connector or port may enable the portable media device to couple to a host computer, be inserted into a docking system, or receive an accessory device. In the case of the iPod®, for example, a vast array of accessory devices have been developed that may interconnect to the portable media device. For example, a remote control may be connected to the connector or port to allow the user to remotely control the portable media device. As another example, an automobile may include a connector and the portable media device may be inserted onto the connector such that an automobile media system may interact with the portable media device, thereby allowing the media content on the portable media device to be played within the automobile. In another example, a digital camera may be connected to the portable media device to download images and the like.

Portable media devices commonly connect with remote devices for playback or presentation of media assets stored on the portable media device. A user may want to dock a portable media device to a home stereo system (or in-vehicle stereo system), for example, and play back songs stored on the portable media device but with the sound experience provided by the home stereo system. In such situations, it is convenient for the user to be able to operate the portable media device remotely, e.g., using controls of the home stereo system or a remote control device that communicates with the home stereo system.

It has been generally known in the art to provide control over various operations of a portable media device via an accessory and vice versa. A communication protocol is provided, by which the accessory and the portable media device can exchange instructions and information. Using suitable command signals, the accessory can invoke the playback functions of the portable media device and can obtain certain information about media assets stored on the portable media device.

BRIEF SUMMARY

Existing interface protocols allow a portable media device (PMD) to control whether and how an accessory accesses functionality of the PMD. Such protocols restrict and/or limit access by third party devices that are error prone, disruptive, resource draining, and/or damaging to the media player. Moreover, such protocols may provide copy protections to media resources that are subject to copy restrictions. Most often accessories authenticate themselves using a trusted authentication scheme known by the PMD in order to receive permissions to access and/or control the PMD via a communication port. These permissions may be granted by the PMD to the communication port coupled with the accessory. Embodiments disclosed herein allow authentication of an accessory device through a port that is not coupled with the accessory device, referred to herein as cross-transport authentication (CTA).

One embodiment provides for a method for cross-transport authentication of an accessory device at a portable media device (PMD) that is communicatively coupled to the accessory device. In one embodiment the PMD receives a cross-transport authentication request via a first port. The authentication request may specify a second port for which cross-transport authentication is requested. The portable media device may be communicatively coupled with the accessory via the second port. The first port may be authenticated and a set of permissions established for communication via the first port. A subset (up to and including all) of these permissions may then be transferred, replicated, copied, and/or granted to the second port. Thereafter, the PMD can communicate with the accessory through the second port.

A portable media device (PMD) is also disclosed according to one embodiment. The PMD includes a multi-transport communication interface. The multi-transport communication interface may be configured to exchange commands and data with an accessory through the multi-transport communication interface having a plurality of ports. The PMD may receive a request for cross-transport authentication through a first one of the plurality of ports of the multi-transport communication interface that specifies a second one of the ports as a second port. The PMD may also perform an authentication operation via the first port. If the authentication is successful, the PMD may grant a set of permissions to at least the second port.

A method for providing cross-transport authentication for an accessory coupled with a portable media device using a dongle is provided according to another embodiment. A cross-transport authentication request is received from the dongle through a first port for authorizing communication over a second port. The request may include an identifier that is associated with the second port (alternatively, the identifier could be associated with an accessory connected with the second port). The first port may then be authenticated and permissions granted to the first port by the PMD. A cross-transport authentication request may be received through a second port, the request including an identifier associated with the second port. A determination may then be made whether the identifiers received through the two ports match. In the event the identifiers match, the second port can be provided with the permissions granted to the first port.

In some embodiments, CTA can be provided from a single dongle or connector for multiple destination ports. For example, a dongle can request CTA for all Bluetooth ports (or any other set of ports). At the completion of authentication of the dongle, permissions can be granted to all the Bluetooth ports (or any other set of ports).

Further areas of applicability of the present disclosure will become apparent from the detailed description provided hereinafter. It should be understood that the detailed description and specific examples, while indicating various embodiments, are intended for purposes of illustration only and do not limit the scope of the disclosure.

BRIEF DESCRIPTION OF THE DRAWINGS

FIG. 4 is a table showing an example of a pin out of one connector of an interface system according to one embodiment.

Figure 1A:
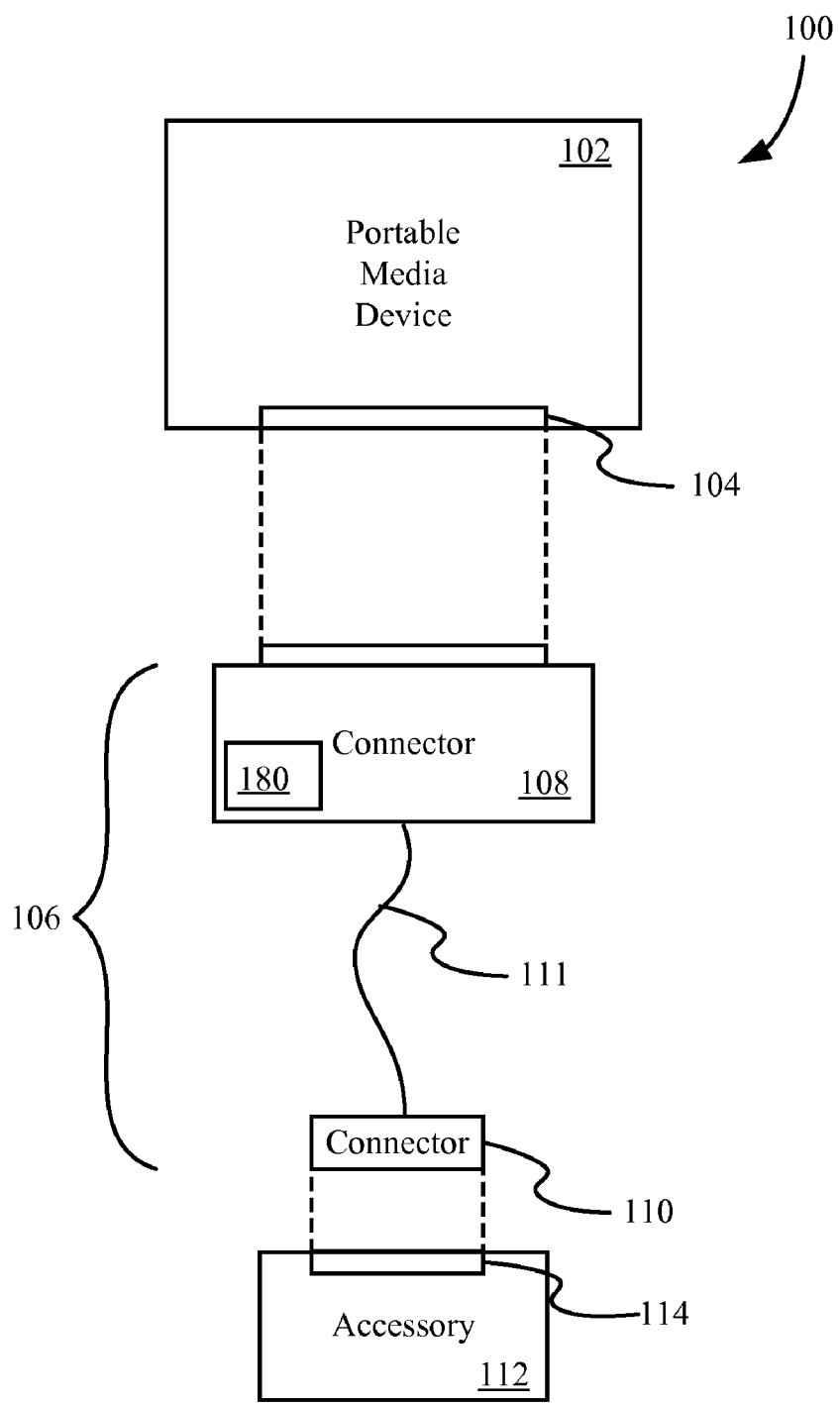
FIG. 1A shows a block diagram of an accessory authentication system according to one embodiment of the invention.

In the appended figures, similar components and/or features may have the same reference label. Where the reference label is used in the specification, the description is applicable to any one of the similar components having the same reference label.

DETAILED DESCRIPTION

The ensuing description provides various embodiments of the invention only, and is not intended to limit the scope, applicability or configuration of the disclosure. Rather, the ensuing description of the embodiments will provide those skilled in the art with an enabling description for implementing an embodiment. It should be understood that various changes may be made in the function and arrangement of elements without departing from the spirit and scope as set forth in the appended claims.

Embodiments described herein provide authentication of a destination port using a requesting port, referred to as "cross-transport authentication." For example, in some embodiments, an interface system may include an authentication controller, a first connector for connecting with a portable media device, a second connector for connecting with an accessory device, and at least one communication port that provides at least one communication channel between the accessory and the portable media device. In some embodiments, the authentication controller may be communicatively coupled with the portable media device over a first port, and the accessory may be communicatively coupled with the portable media device over a second port. Accordingly, in some embodiments, the authentication controller may provide authentication information and/or credentials to the portable media device over a first port. This information and/or credentials may then be used to authenticate the authentication controller over the first port. Once authenticated, permissions may be granted to the first port. These permissions, for example, may define the extent to which an authenticated device may access and/or control various functions the portable media device. These permissions once granted may then be transferred and/or replicated to a second port such that the accessory device may communicate, access and/or control the portable media device despite not being directly authenticated by the portable media device.

As used throughout this disclosure the terms "port" and "transport" are used interchangeably and refer generally to a communication channel between two devices, chips and/or circuits. Communication channels may include wireless as well as wired channels. Moreover, communication channels may also include any of various protocols.

As used throughout this disclosure the terms "permission" or "permissions" when used in conjunction with a portable media device, characterize the information that may be received from a portable media device, the commands that may be used to control a portable media device, and/or the functionality that may be accessed in the mobile communication device. Permissions may be granted as a group or individually. Moreover, in some embodiments, permissions may be assigned to a specific device and/or port.

FIG. 1A is a block diagram of a cross-transport authentication system 100 according to one embodiment. Cross-transport authentication system 100 includes a portable media device 102. Additionally, portable media device 102 may include, for example, a media player, a personal digital assistant, and/or a mobile telephone. For example, the portable media device may be an iPod® or an iPhone® or the like. Portable media device 102 includes connector interface 104 for receiving a connector. Connector interface 104 can provide multiple physically or logically distinct communication ports via which other devices can communicate with portable media device 102. For example, connector interface 104 can provide a USB port, a UART port, and/or a FireWire port. In some embodiments, connector interface 104 can also support wireless connections (e.g., Bluetooth or Wi-Fi) that do not require a physical connector.

Cross-transport authentication system 100 may also include an interface 106 having two connectors 108, 110, which may be connected by a cable 111. The cable may include more than one communication transport. First connector 108 may be connected with a portable media device 102 and second connector 110 may be connected with accessory 112, as indicated by dashed lines in FIG. 1A. When connected with portable media device 102, first connector 108 may be received by connector port 104. When first connector 108 is coupled with connector port 104, interface 106 may be physically and/or electrically connected to portable media device 102. In some embodiments, when first connector 108 is coupled with connector interface 104, connections are established to at least two of the communication ports of portable media device 102, thereby establishing at least two communication channels with portable media device 102. In some embodiments, first connector 108 includes authentication controller 180.

Cross-transport authentication system 100 further includes an accessory 112. Accessory 112 may provide certain enhanced functionality to portable media device 102 when accessory 112 is interconnected with portable media device 102 via interface 106. For example, accessory 112 may include a speaker system that can reproduce sounds based on audio signals (e.g., digitally encoded audio data) received from portable media device 102 and/or a display system that can display images based on image signals (e.g., digitally encoded pixel data) received from portable media device 102. As another example, accessory 112 may implement a remote control that allows a user to control functions of portable media device 102 by interacting with a user interface of accessory 112. To facilitate such interconnection, accessory 112 includes a connector port 114. Interface 106 may be coupled with accessory 112 using second connector 110. When accessory 112 is connected with interface 106, accessory 112 may be physically and/or electrically connected with interface 106, and accessory 112 may be electrically coupled with portable media device 102 via interface 106.

As noted above, interface 106 may provide more than one communication channel between portable media device 102 and accessory 112. For example, authentication controller 180 may communicate through a first port of connector interface 104 (e.g., a UART port) while accessory 112 communicates through a second port of connector interface 104 (e.g., a USB port). In other embodiments, wireless interfaces may be used to provide one or more communication channels. While such interfaces do not require a physical connector, nevertheless the various embodiments described herein may be extended to wireless applications.

According to some embodiments, interface 106 can use authentication controller 180 communicating through a first port of connector interface 104 to establish authentication on behalf of accessory 112 communicating through a second port of connector interface 104.

Authentication controller 180 can request "cross-transport" authentication through the first port (also referred to herein as a "requesting port") of interface unit 106 and can specify that the authentication privileges established via the first port are to be shared with or transferred to the second port (also referred to as a "destination port"), to which accessory 112 is connected. Portable media device 102 can perform an authentication process in conjunction with authentication controller 180 over the requesting port, and based on the result of this process, portable media device 102 may grant various permissions to the requesting port. During a cross-transport authentication, once authentication completes on the requesting port, some or all of the permissions thereby granted may be replicated or transferred to the destination port that is communicatively coupled with accessory 112.

Consequently, the nature and degree of the interaction between interface 106 and/or accessory 112 and portable media device 102 can be controlled. For example, in some embodiments, upon successful authentication, portable media device 102 may consider interface 106 and/or accessory 112 to be a trusted partner that is permitted to access functions, features or operations of portable media device 102. On the other hand, if portable media device 102 determines that interface 106 and/or accessory 112 is not a trusted partner (e.g., because authentication fails), then portable media device 102 can prevent or limit interactions with interface 106 and/or accessory 112. Interface 106 itself, for example, may also be considered an accessory device for portable media device 102.

In some embodiments, interface 106 can serve in part as a bus interface adapter, such as a USB or FireWire® adapter. In such an embodiment, interface 106 serves in part to adapt portable media device 102 to a bus host device (e.g., USB or FireWire® host). Accessory 112 then advantageously need only operate as a bus peripheral device (e.g., USB or FireWire® device).

Figure 1B:
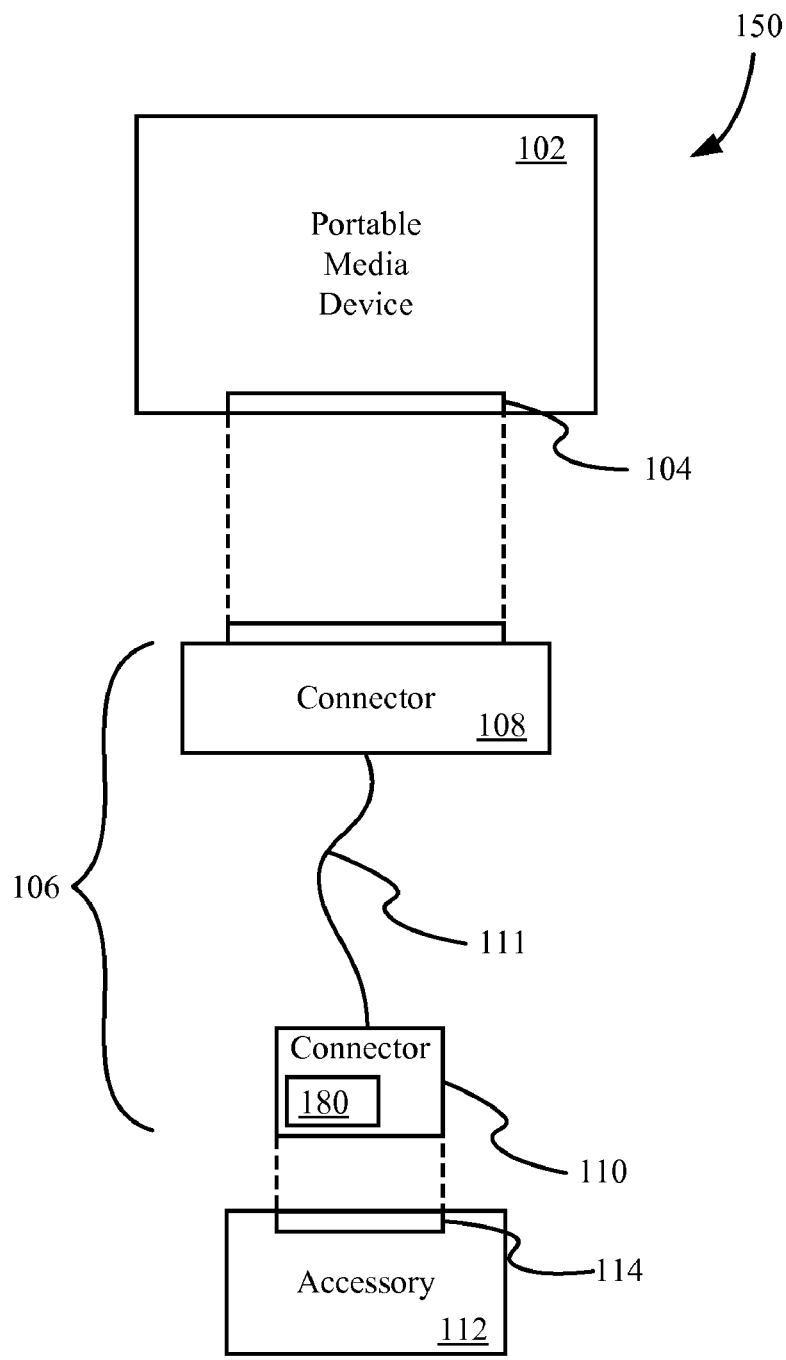
FIG. 1B shows another block diagram of an accessory authentication system according to one embodiment of the invention.

FIG. 1B is a block diagram of a cross-transport authentication system 150 according to another embodiment. This cross-transport authentication system 150 is similar to cross-transport authentication system 100 shown in FIG. 1A. However, according to this embodiment, authentication controller 180 is found within second connector 110 that may be used to couple interface 106 with accessory 112.

Figure 1C:
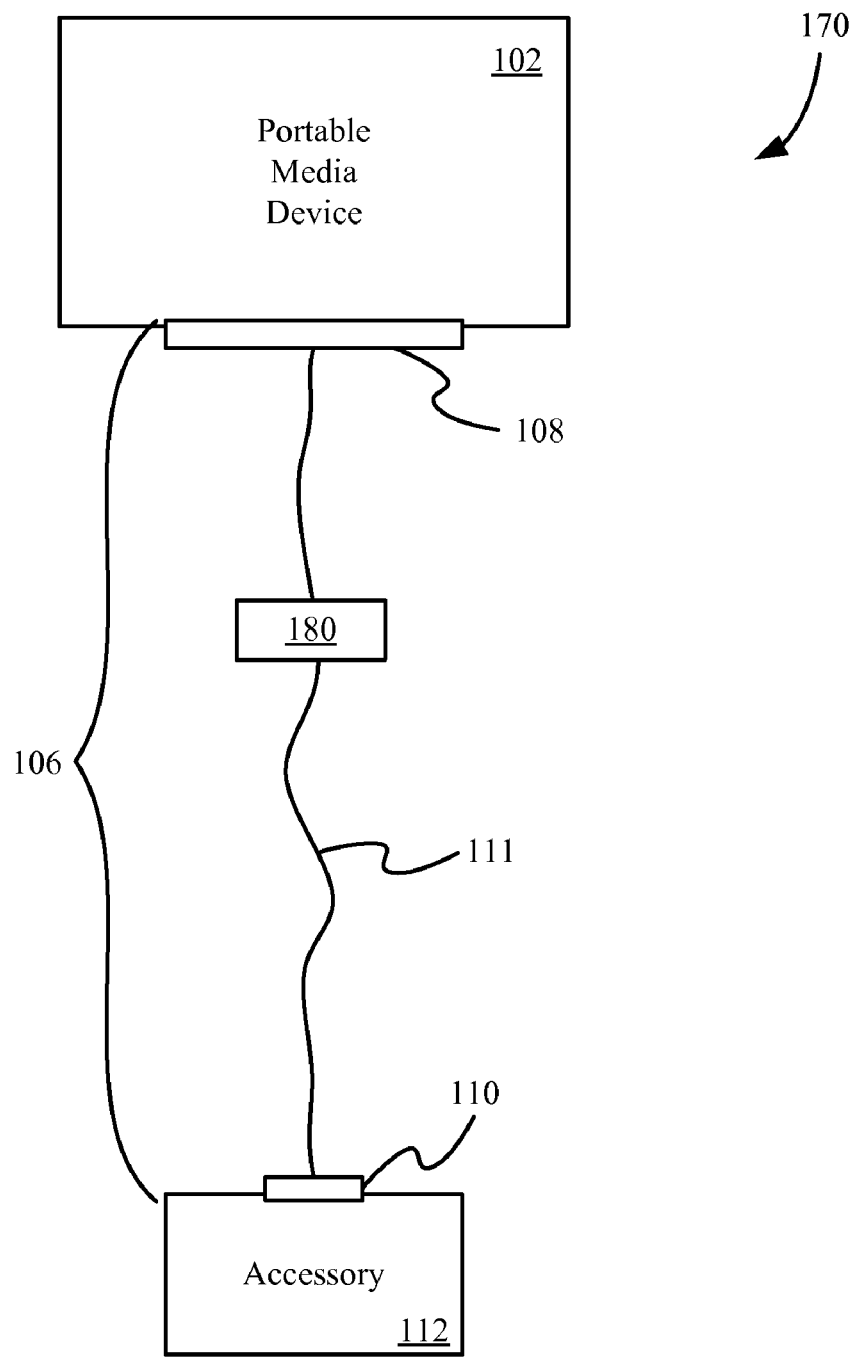
FIG. 1C shows a block diagram of an accessory coupled with a portable media device using cross-transport authentication according to one embodiment.

FIG. 1C is a block diagram of a cross-transport authentication system 170 according to another embodiment. This cross-transport authentication system 170 is similar to cross-transport authentication system 100 shown in FIG. 1A. However, according to this embodiment, authentication controller 180 is embedded within interface 106. Wire or cable 111 may provide at least a communication channel between accessory 112 and PMD 102 as well as a communication channel between authentication controller 180 and PMD 102.

Figure 1D:
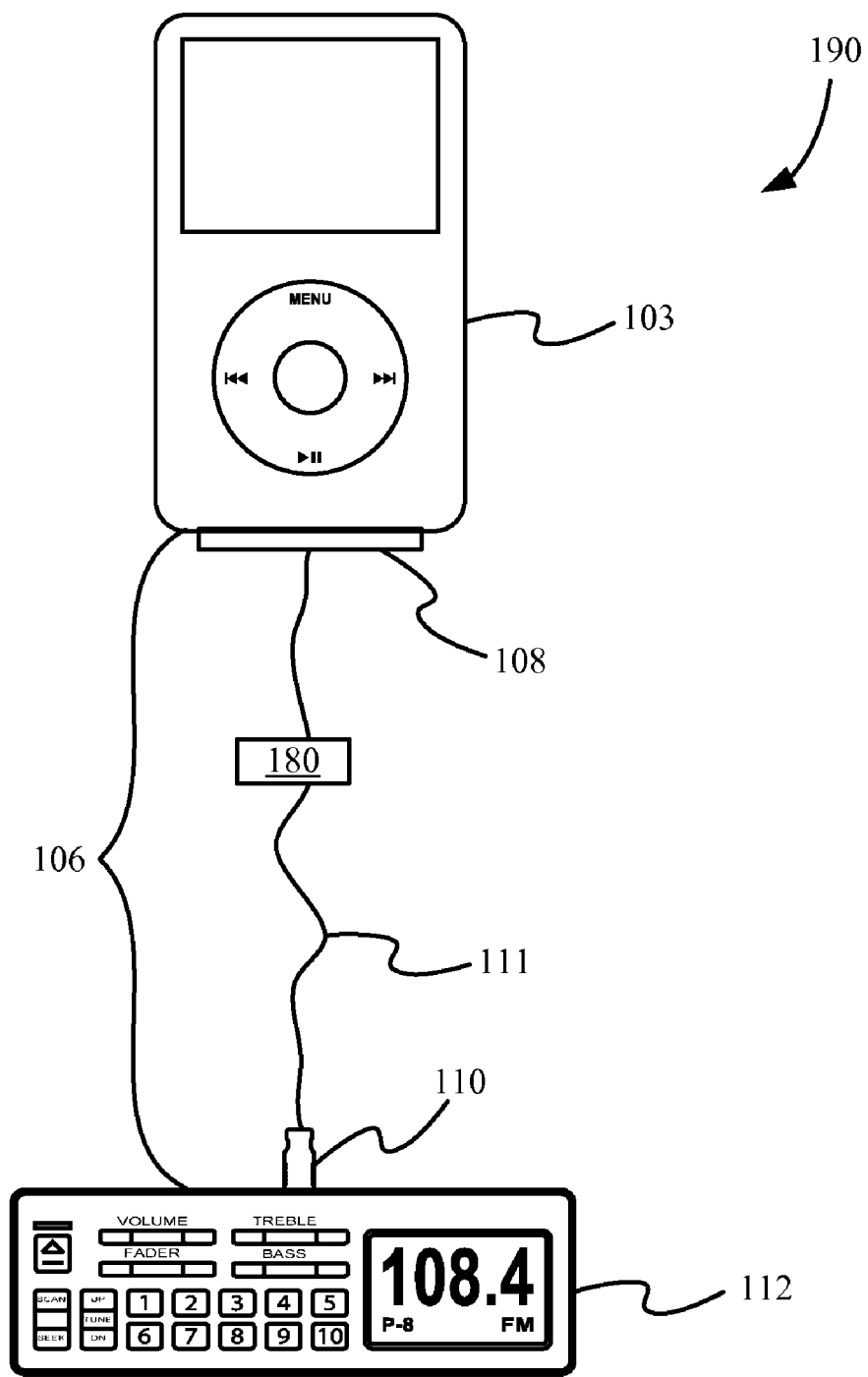
FIG. 1D shows a block diagram of a car stereo coupled with an iPod® using cross-transport authentication according to one embodiment.

FIG. 1D is a block diagram of a specific application for a cross-transport authentication system 190 according to one embodiment. This cross-transport authentication system 190 is similar to the cross-transport authentication system 170 shown in FIG. 1C. According to this embodiment, first connector 108 may be a 30 pin connector and may be connected with an iPod® 103. Second connector 110 may be a USB connector and may be connected with a car stereo 112. As shown, authentication controller 180 is found within the cable 111 of interface 106. However, in other embodiments, authentication controller 180 may be found within either connector 108, 110 as shown in FIGS. 1A and/or 1B.

For example, authentication controller 180, may connect with iPod® 103 with a serial transport (e.g., UART) and may send a cross-transport request to the iPod® 103 using the serial transport. For example, the cross-transport request may request authentication for a USB transport that connects car stereo 112 with the PMD. Thus, upon authentication, car stereo 112 through the USB transport may receive the authentication permissions provided by the iPod® 103 to operate and/or communicate with the iPod® 103, and consequently (depending on the permissions provided), a user can control various functions of iPod® 103 via car stereo 112. Moreover, in some embodiments, the serial transport may continue to be authorized along with the USB transport. In other embodiments, some or all the permissions are transferred to the USB transport. Once a transport has been authorized a set of permissions may be assigned to the transport. These permissions, for example, may define the information that may be received, the commands that may be used, and/or the functionality that may be accessed in the iPod® or any other mobile communication device by the accessory.

Figure 2A:
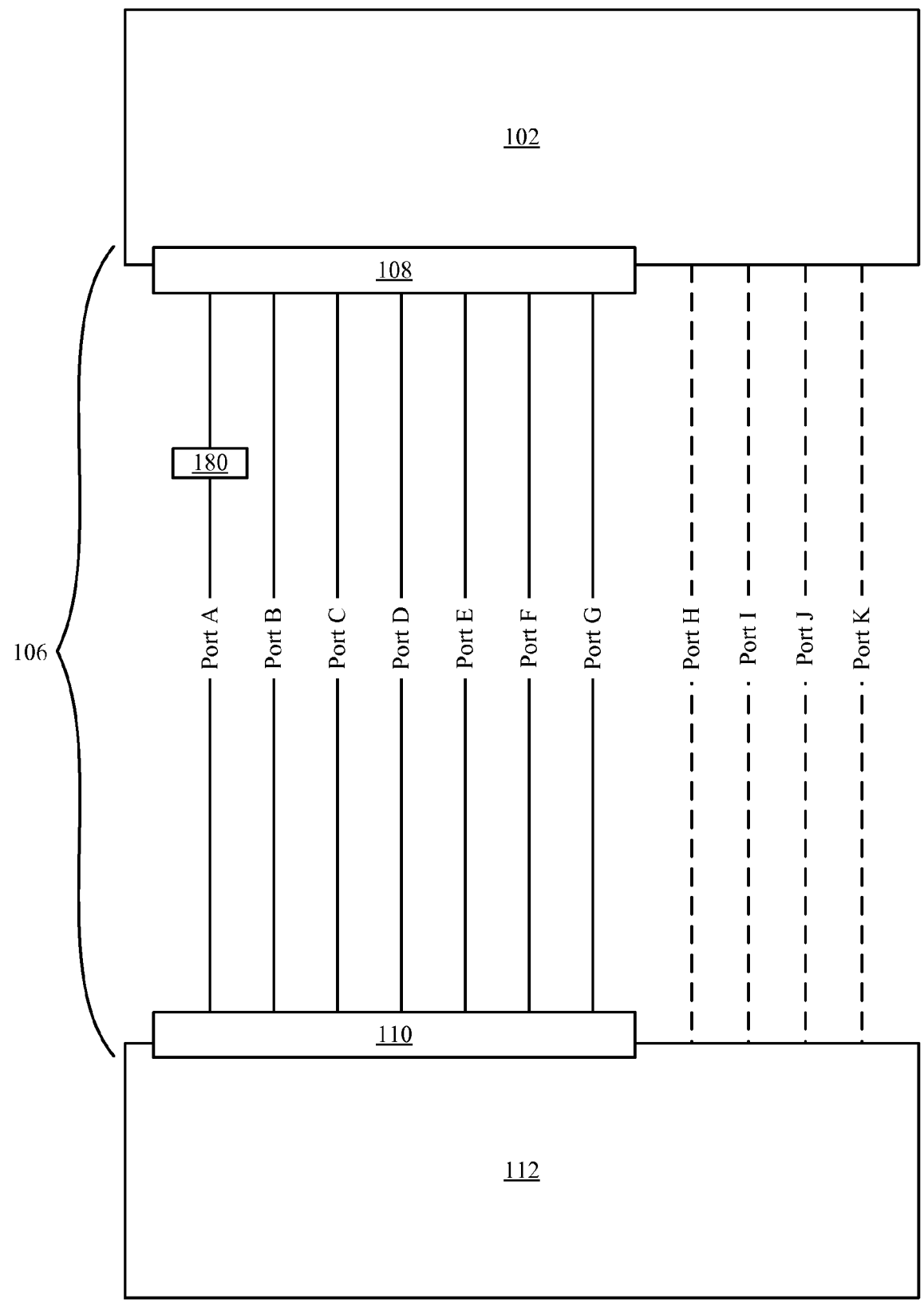
FIGS. 2A and 2B show transport channels with an interface system according to one embodiment.
Figure 2B:
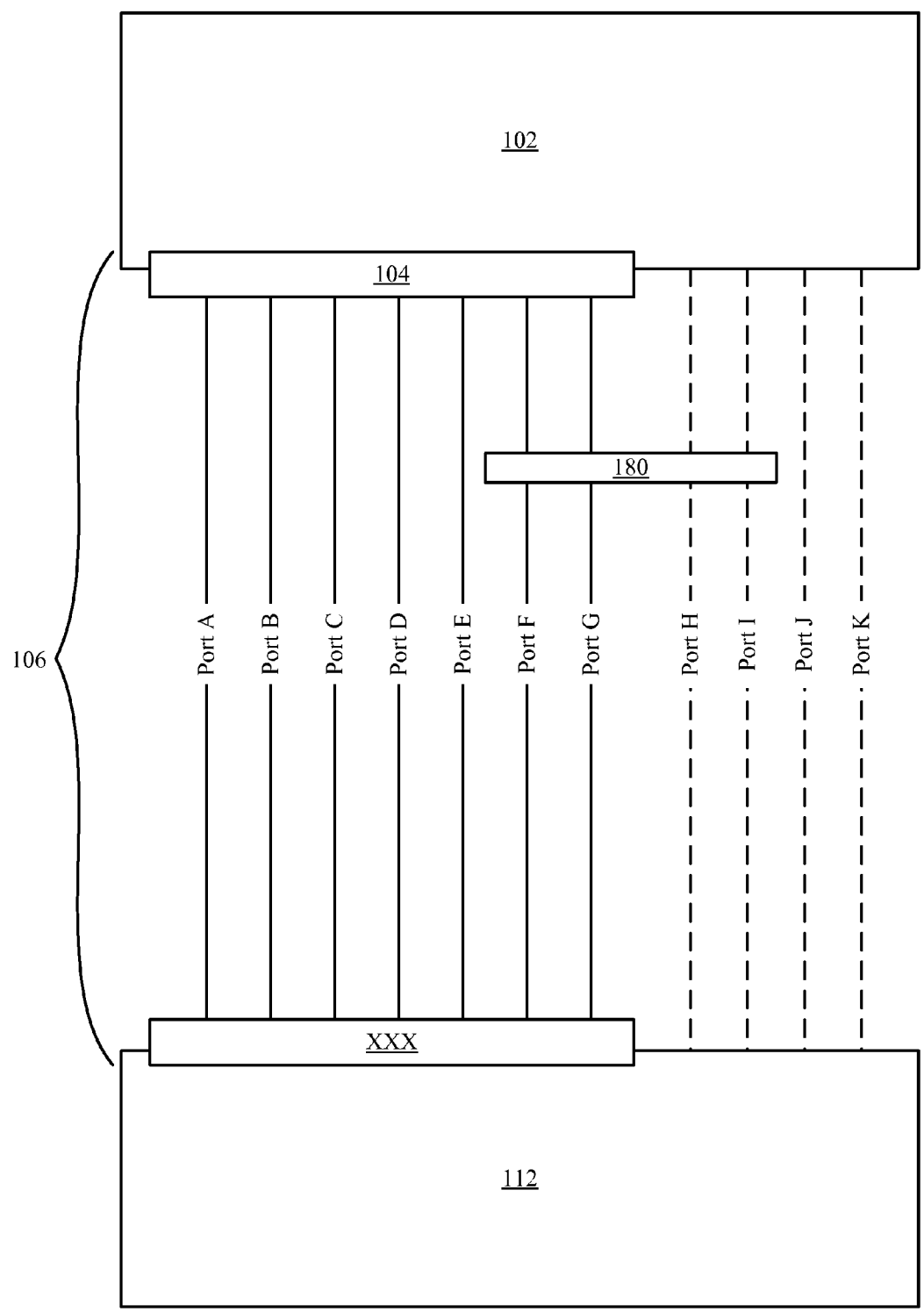

FIG. 2A shows a plurality of ports that may be provided for communication between PMD 102 and an accessory 112 according to one embodiment. The dashed lines represent wireless transports, for example, Wi-Fi, Bluetooth, 3G, Edge, cellular, wireless USB, etc. The solid lines represent wired transports, for example, USB, serial, FireWire, UART, etc. As shown, a single port, Port A, is coupled with authentication controller 180. FIG. 2B shows a similar figure with a number of ports, Port F, Port G, Port H, and Port I coupled with the authentication controller according to another embodiment. Thus, authentication controller 180 can be capable of communicating via one or more different ports. While FIGS. 2A and 2B show multiple ports connected between PMD 102 and accessory 112, it is to be understood that this is not required; accessory 112 might communicate via only one port, and that can be a different port from the port(s) via which authentication controller 180 is capable of communicating.

Figure 3:
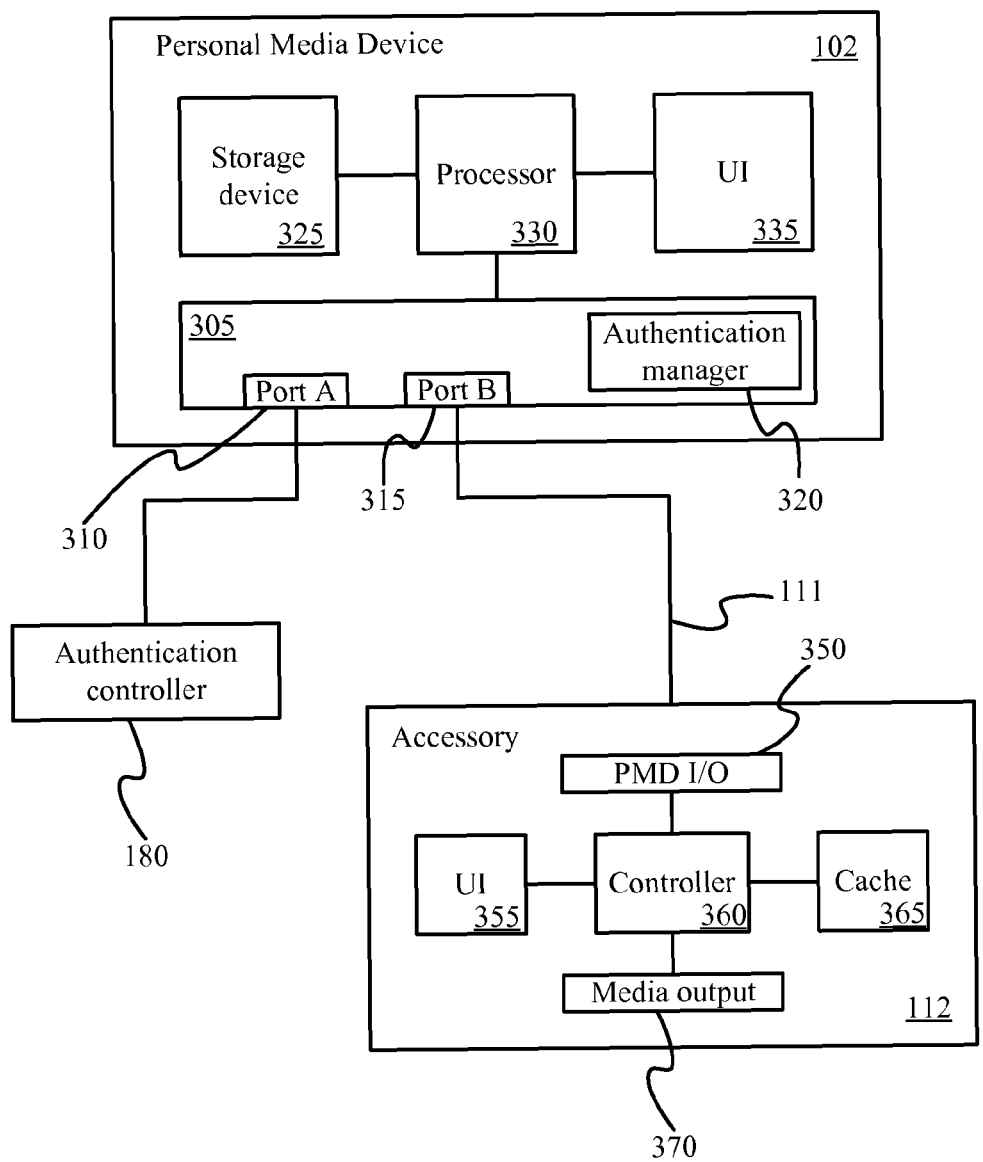
FIG. 3 shows a block diagram of a portable media device (PMD) coupled with an authentication controller and an accessory according to one embodiment.

FIG. 3 shows a block diagram of a PMD 102 coupled with an authentication controller 180 and an accessory 112 according to one embodiment. PMD 102 in this embodiment can provide media player capability. PMD 102 can include processor 330, storage device 325, user interface (UI) 335, and accessory input/output (I/O) interface 305. Processor 330 in some embodiments can implement various software programs stored in storage device 325. In doing so, processor 330 may interact with accessory 112 through I/O interface 305 and user interface 335.

Storage device 325 may be implemented, e.g., using disk, flash memory, or any other non-volatile storage medium. In some embodiments, storage device 325 can store media assets (also referred to herein as "tracks"), such as audio, video, still images, or the like, that can be played by PMD 102. Storage device 325 can implement a database that stores media assets and also stores metadata records associated with each media asset. The metadata record for a given asset can include various fields, e.g., a media type (audio track, video track, audio book, still image, etc.); an asset title; a name of an artist or performer associated with the asset; composer or author information; asset length; chapter information; album information; lyrics; information about associated artwork or images; description of the asset; and so on. The database can also include "playlists", which are lists of assets that can be played sequentially. Playlists can include user-created playlists and/or automatically generated playlists.

Storage device 325 can also store other information such as information about a user's contacts (names, addresses, phone numbers, etc.); scheduled appointments and events; notes; and/or other personal information. In still other embodiments, storage device 325 can store one or more programs to be executed by processor 330 (e.g., video game programs, personal information management programs, programs implementing a playback engine and/or a database engine, etc.).

User interface 335 may include input controls such as a touch pad, touch screen, scroll wheel, click wheel, dial, button, keypad, microphone, or the like, as well as output devices such as video screen, indicator lights, speakers, headphone jacks or the like, together with supporting electronics (e.g., digital-to-analog or analog-to-digital converters, signal processors or the like). A user can operate the various input controls of user interface 335 to invoke the functionality of PMD 102 and can view and/or hear output from PMD 102 via user interface 335.

Accessory I/O interface 305 can allow PMD 102 to communicate with various accessories. Accessory I/O interface 305 includes at least two ports, port A 310 and port B 315. Various other wired and wireless ports may be included. These ports, for example, may include those described above in regard to FIGS. 2A and 2B. Port A 310 is coupled with authentication controller 180 and port B 315 is coupled with accessory 112. Accessory I/O interface 305 may also include an authentication manager 320, which may communicate with an authentication controller to authenticate and provide privileges (or permissions) to an accessory. Authentication manager 320 may perform cryptography functions in conjunction with the authentication controller 180. In some embodiments, such cryptography functions include public-private key cryptography. An example of an authentication manager 320 is described below in relation to FIG. 5B.

For example, accessory I/O interface 305 through port B 315 might support connections to various accessories such as an external speaker dock, a radio (e.g., FM, AM and/or satellite) tuner, an in-vehicle entertainment system, an external video device, or the like. In one embodiment, accessory I/O interface 305 includes a 30-pin connector corresponding to the connector used on iPod® products manufactured and sold by Apple Inc. Alternatively or additionally, accessory I/O interface 305 can include a wireless interface (e.g., Bluetooth or the like).

In some embodiments, PMD 102 can also use accessory I/O interface 305 to communicate with a host computer (not explicitly shown) that executes a media asset management program (such as the iTunes® media asset management program distributed by Apple Inc.). The media asset management program can enable a user to add media assets to PMD and/or remove media assets from PMD 102. The user can also update metadata associated with media assets on PMD 102. In some embodiments, the user can also interact with the media asset management program to create and update playlists. In one embodiment, the host computer maintains a master database of media assets (including associated metadata and playlists), and the media asset management program synchronizes the master database with the database maintained on storage device 325 of PMD 102 automatically whenever PMD 102 connects to the host computer.

Accessory 112 includes controller 360, user interface 355, PMD I/O interface 350, cache 365, and media output device 370. Controller 360 can include, e.g., a microprocessor or microcontroller executing program code to perform various functions such as digital audio decoding, analog or digital audio and/or video processing, and the like. User interface 355 may include input controls such as a touch pad, touch screen, scroll wheel, click wheel, dial, button, keypad, microphone, or the like, as well as output devices such as video screen, indicator lights, speakers, headphone jacks or the like, together with supporting electronics (e.g., digital-to-analog or analog-to-digital converters, signal processors or the like). Alternatively, output components of user interface 355 can be integrated with media output device 370. A user can operate the various input controls of user interface 355 to invoke the functionality of accessory 112 and can view and/or hear output from accessory 112 via user interface 355. In addition, in some embodiments, a user can operate PMD 102 via user interface 355.

PMD I/O interface 350 can allow accessory 112 to communicate with PMD 102 (or another PMD). In some embodiments, PMD I/O interface 350 is configured to connect to a specific port (e.g., port B 315) of PMD 102. Examples are described below.

Cache 365, which can be implemented using volatile and/or nonvolatile memory provides storage for various information including information obtained from PMD 102. For example, in some embodiments, accessory 112 can obtain metadata and/or playlist information from PMD 102. Any or all of this information can be stored in cache 365. Caching of information obtained from PMD 102 by accessory 112 is optional; where used, caching can help speed up performance of accessory 112 by avoiding repeated requests for information from PMD 102.

Media output device 370, which can be implemented, e.g., as one or more integrated circuits, provides the capability to output various types of media. For example, media output device 370 can include a display screen or a driver circuit and connector for an external display screen, thereby enabling video and/or still images to be presented to a user. Additionally or instead, media output device 370 can also include one or more speakers or driver circuits and connectors for external speakers, thereby enabling audio to be presented to a user. In one embodiment, controller 360 can receive media content signals from PMD 102 via PMD I/O interface 350 and can provide the signals with or without further processing to media output device 370; media output device 370 can transform the signals as appropriate for presentation to the user.

Accessory 112 can be any accessory capable of being used with a portable media device. Examples of accessories implementing accessory 112 include, e.g., an external speaker dock, a radio (e.g., FM, AM and/or satellite) tuner, an in-vehicle entertainment system, an external video device, or the like. In one embodiment, PMD I/O interface 350 includes a 30-pin connector that mates with the connector used on iPod® products manufactured and sold by Apple Inc. PMD I/O interface 350 can also include other types of connectors, e.g., Universal Serial Bus (USB) or FireWire connectors. Alternatively, PMD I/O interface 350 can include a wireless interface (e.g., Bluetooth or the like).

According to some embodiments, accessory 112 does not include an authentication controller. Accordingly, accessory 112 may not authenticate itself and receive privileges from PMD 102. Instead, authentication for accessory 112 may be provided through an authentication controller 180 external to accessory 112 using cross-transport authentication as described herein. Authentication controller 180 is coupled with PMD 102 through a separate port (e.g., port A 310). In some embodiments, cross-transport authentication may be initiated and/or performed by authentication controller 180 in conjunction with authentication manager 320. Once authenticated, privileges and/or permissions authenticated to authentication controller 180 through port A may be transferred and/or copied to accessory 112 through port B.

It will be appreciated that the system configurations and components described herein are illustrative and that variations and modifications are possible. The PMD and/or accessory may have other capabilities not specifically described herein.

FIG. 4 is a table showing an example of a pin out of one connector of an interface system according to one embodiment. According to this embodiment, several of the pins are used as an asynchronous serial transport and several are used for a universal serial bus (USB) transport. In this embodiment, a connector with this pin out may be coupled with a portable media device, such as the iPod®. Any configuration of pins and ports can be used, and in some embodiments, one or more of the ports may be a wired or wireless port.

Figure 5A:
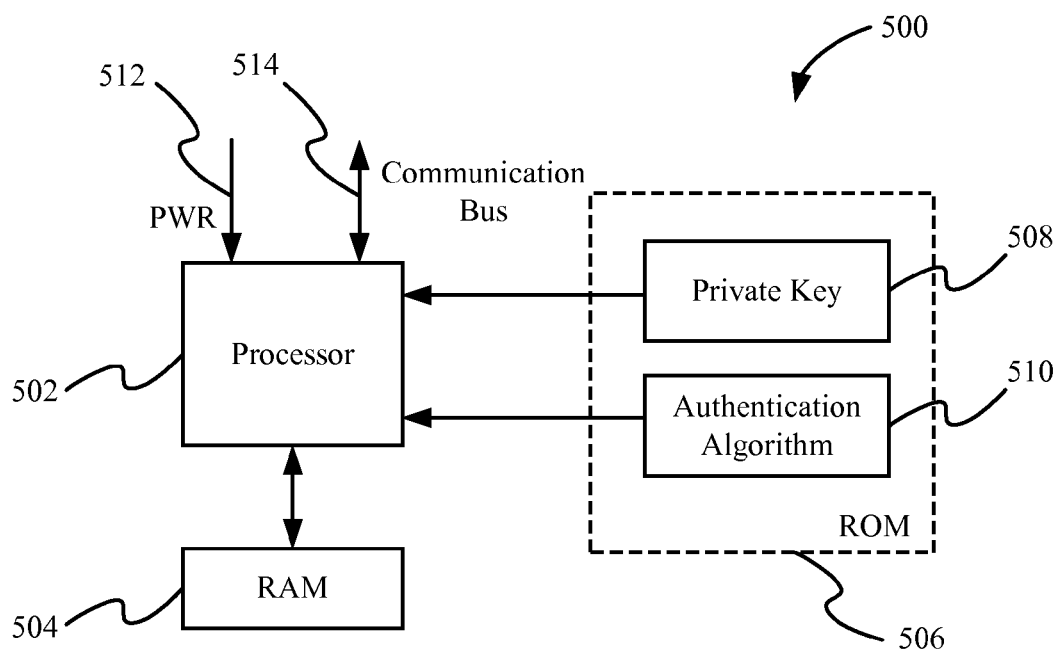
FIG. 5A is a block diagram of an authentication controller according to one embodiment of the invention.

FIG. 5A is a block diagram of an authentication controller 500 according to one embodiment. Authentication controller 500 can be, for example, an implementation of authentication controller 180 of any of FIGS. 1A-1D. Authentication controller 500 includes a processor 502, a random access memory (RAM) 504, and a read-only memory (ROM) 506. ROM 506 may include a private key 508 and/or an authentication algorithm 510. Authentication controller 500 may also receive a power line 512 and/or a communication bus (link) 514 that is connectable to a port of a portable media device. For example, power line 512 and/or communication bus 514 can be provided to authentication controller 500 via a connector, such as connector 108 illustrated in FIGS. 1A, 1B, 1C and/or 1D.

Processor 502 may interact with a portable media device (for example, via a communication bus 514) to authenticate an accessory device. For example, the communication bus may connect to one of a plurality of communication ports of a portable media device. During an authentication process, processor 502 makes use of an authentication algorithm 510 as well as a private key 508 stored within authentication controller 500. Authentication algorithm 510 can vary with different implementations, and suitable authentication algorithms are known to those skilled in the art.

Although not shown in FIG. 5A, authentication controller 500, or an authentication device or accessory device including or utilizing authentication controller 500, can further include a device identifier and additional circuitry. The device identifier can, for example, pertain to a product identifier, a device identifier, and/or a manufacturer identifier. The additional circuitry can vary with implementation.

In one embodiment, authentication controller 500 is implemented on a single integrated circuit, for example, on a single chip. By providing authentication controller 500 on a single integrated circuit, external access to private key 508 and/or authentication algorithm 510 may be substantially reduced. As a result, the authentication process may not only be cryptographically secured but also physically secured by limited physical access.

Figure 5B:
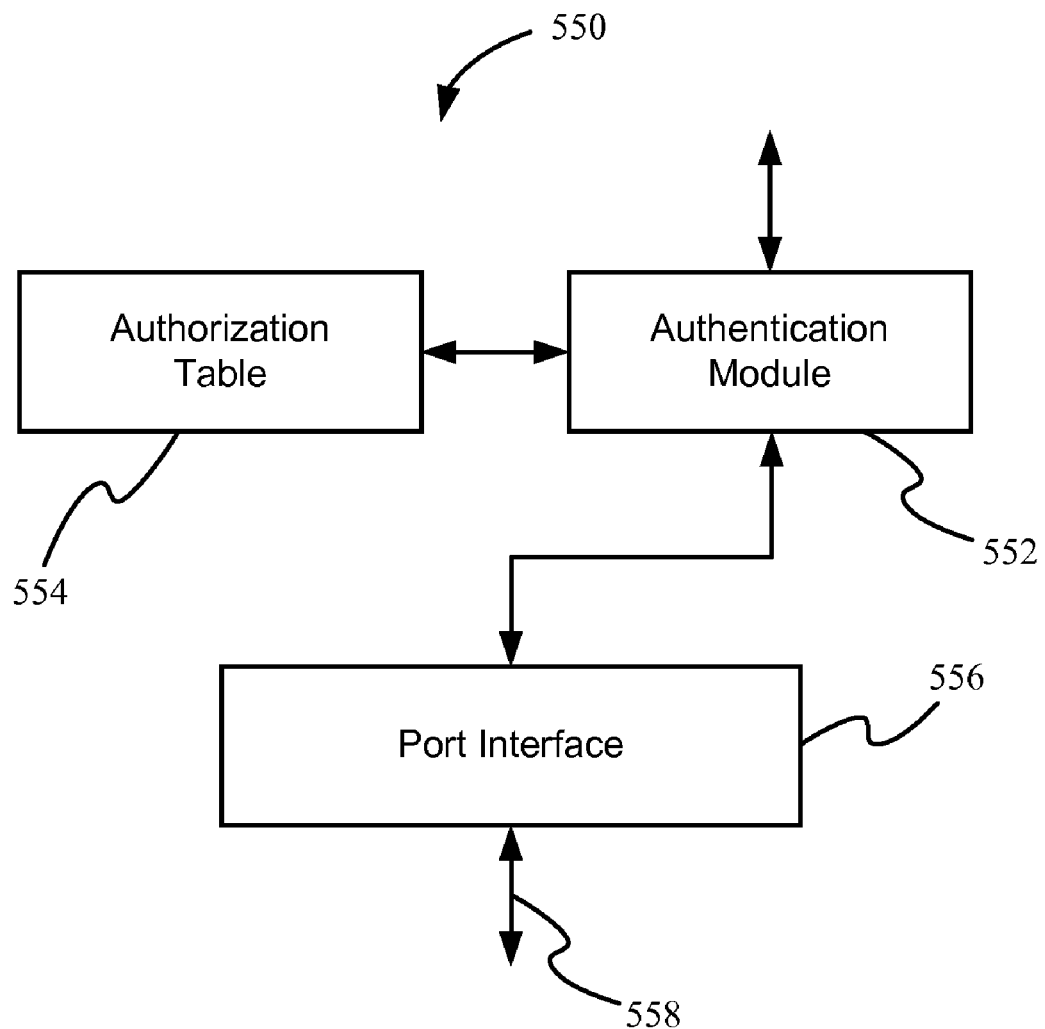
FIG. 5B is a block diagram of an authentication manager according to one embodiment of the invention.

FIG. 5B is a block diagram of an authentication manager 550 according to one embodiment of the invention. Authentication manager 550 can be, for example, provided within an electronic device, such as portable media device 102 illustrated in FIGS. 1A, 1B, 1C and/or 1D. In this embodiment, authentication manager 550 of the portable media device authenticates an accessory device and/or port.

Authentication manager 550 may include an authentication module 552, an authorization table 554, and a port interface 556. Authentication controller 552 may operate to evaluate whether a particular accessory device, authentication controller, and/or port is authentic and therefore permitted to interoperate with the portable media device. Port interface 556 can provide power and a communication bus 558 to the device being authenticated. Port interface 556 may correspond to one of the ports of PMD 102 (e.g., port A 310) as shown in FIG. 3. In some embodiments, port interface 556 is configured such that authentication module 552 can be connected to any (or all) of the ports of the portable media device. Authorization table 554 stores authentication information that is utilized by authentication controller 552 to evaluate whether certain accessory devices are authentic. As previously noted, authentication manager 550 may be provided within a portable media device.

A portable media device may include various operating features that can be invoked or utilized. In one embodiment, an accessory device that is authenticated by authentication manager 550 can have complete access to all of the features available on the portable media device. In another embodiment, authorization table 554 can control the manner in which the features of the portable media device are made available to the accessory device. As an example, if the portable media device offers a plurality of different features that can be utilized, authorization table 554 can contain an indication as to which of these available features are permitted to be utilized by a particular accessory device. These permitted features and/or controls may also be called permissions. For example, authorization may be classified into levels or classes, each of which having different authorizations, allowing different types of accessories access to different (possibly overlapping) subsets of the media device functionality. An authorization can also specify the manner by which the different features are authorized for use. Hence, features may be authorized for use in limited ways. For example, a feature may be authorized for use over a slow communication interface (e.g., serial) with the portable media device and not over a fast communication interface (FireWire® or USB) with the portable media device. In other words, in this example, features may be authorized for use over only certain interface mechanisms and/or with certain accessory devices.

Figure 6:
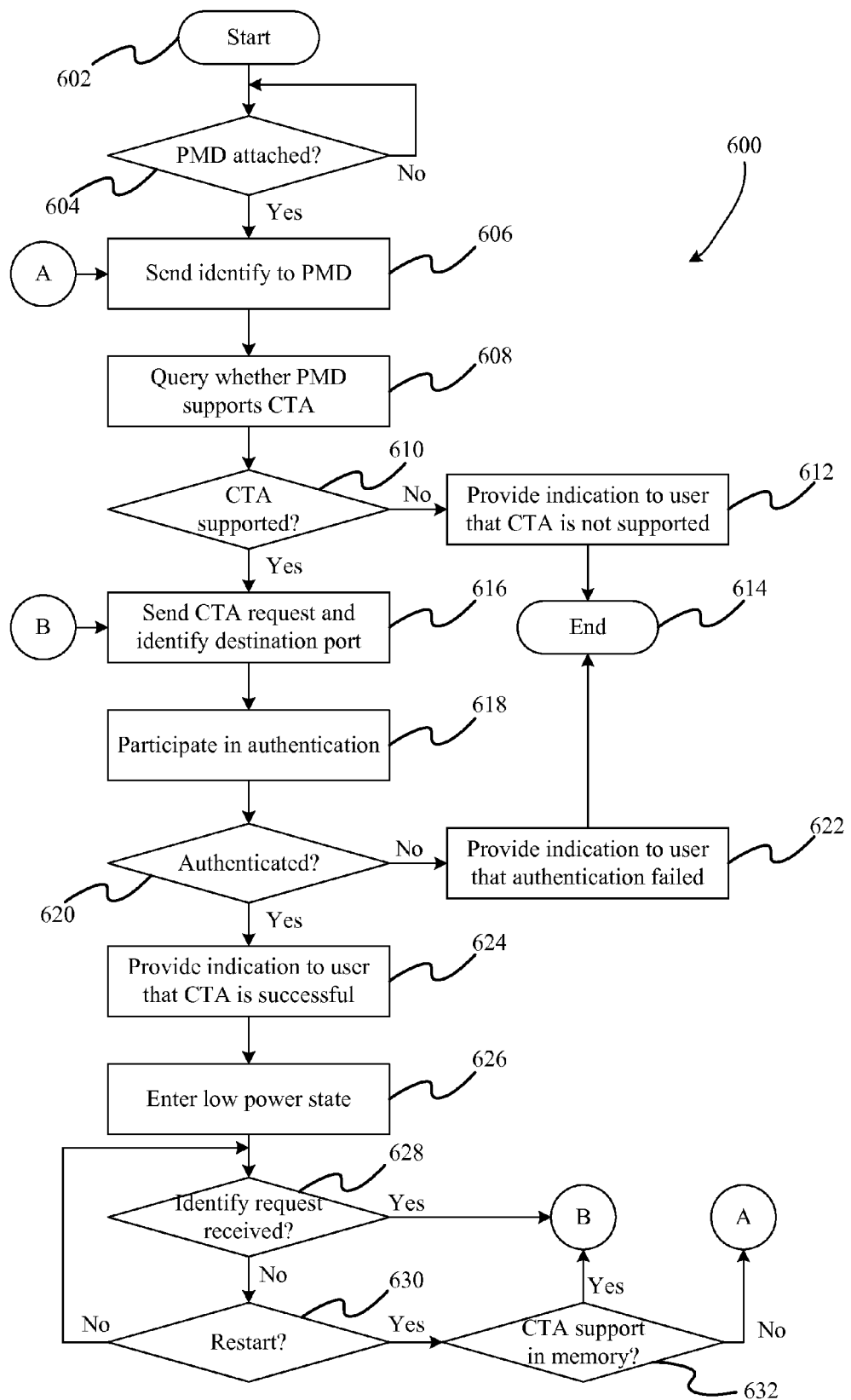
FIG. 6 is a flowchart showing an authentication controller (AC) making a request for cross-transport authentication from a PMD according to one embodiment.

FIG. 6 is a flowchart showing a process 600 that can be used by an authentication controller (AC) making a request for cross-transport authentication from a PMD according to one embodiment. Process 600 starts at block 602 when an authentication controller is coupled with a portable media device at block 604. In some embodiments, the authentication controller may be coupled with a portable media device using a multi-channel cable. Moreover, the authentication controller may be incorporated into the multi-channel cable. The accessory may be notified that a PMD is attached, for example, when power from the PMD is connected with the accessory or when a particular pin on a connector is driven to a logic low (or high) state or the like. In some embodiments, the authentication controller may also wait until an accessory is attached.

An identification message may then be sent to the PMD at block 606. The identification message may include a device identifier. An acknowledgement message may be returned by the PMD in response to the identification message. Following sending the identification message, the process 600 may query whether the PMD supports cross-transport authentication (CTA) at block 608. In some embodiments, this query may ask for a PMD identifier or version number from the PMD to determine whether CTA is supported. The determination may be made at the PMD and a confirmation message sent to the authentication controller or data may be sent to the authentication controller, such a PMD identifier or version number, from which the authentication controller makes the determination at block 610.

At block 610, if CTA is not supported, then an indication may be provided to a user at block 612. For example, an LED may illuminate, signifying failure. As another example, a digital display may be used to communicate CTA failure. After making such an indication, process 600 ends at block 614.

Figure 10:
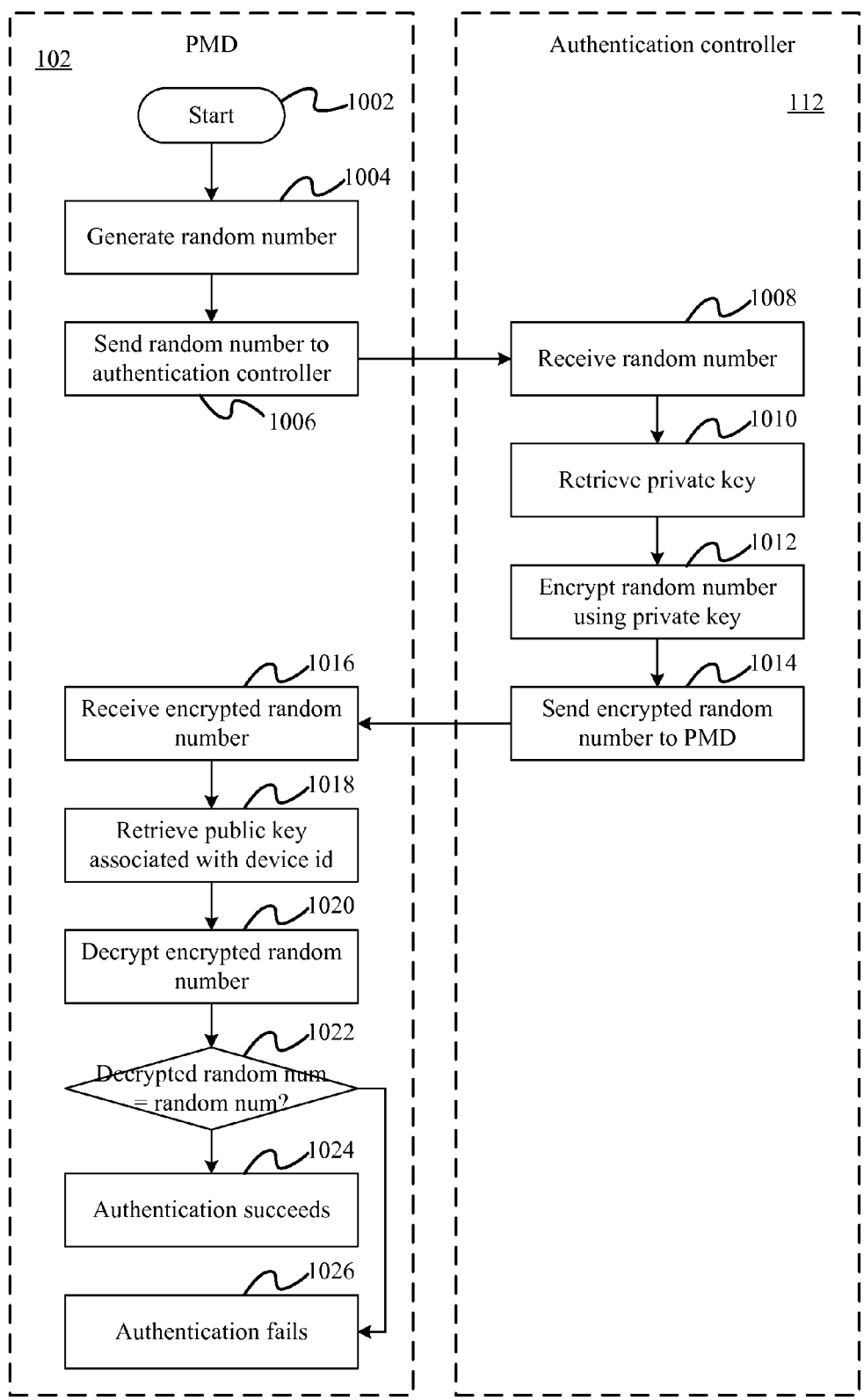
FIG. 10 shows an example of an authentication process between a PMD and an authentication controller according to one embodiment.

At block 610, if CTA is supported, then authentication controller sends a CTA request to the PMD at block 616. The authentication request, for example, may include an indication of the port for which cross-transport authentication is requested (destination port) and/or the port from which cross-transport authentication is being requested (requesting port). Referring to the example shown in FIG. 3, port A 310 may be indicated as the requesting port and port B 315 may be indicated as the destination port. Referring back to FIG. 6, at block 618, the authentication controller may then participate in the authentication. Various authentication schemes may be used to authenticate the authentication controller. For example, the PMD may send a randomly generated number to the authentication controller. The authentication controller may cryptographically encode the random number using a private key and provide the cryptographic number to the PMD. The PMD may decode the cryptographic number using a public key and compare the decoded number with the random number generated. If there is a match, the authentication controller is authenticated. If there is no match, the authentication controller is not authenticated. A message, for example, from the PMD may be sent to the authentication controller. FIG. 10, described below, shows a further example of an authentication scheme that may be implemented at block 618.

In some embodiments, if the authentication failed, an indication may be provided to the user that CTA has failed at block 622. For example, an LED and/or display may be provided as part of the authentication controller and/or an interface such as interface 106 of FIG. 1A. If the authentication is successful at block 620, an indication of the success can be provided to the user at block 624. Again, an LED and/or display may be provided as part of the authentication controller and/or an interface. Once authentication has succeeded, an accessory connected with the destination port may be granted permissions to the PMD. At this point, the authentication controller may enter a low power state at block 626 and await commands from the PMD. During the low power state, if the PMD sends a request to identify the authentication controller at block 628, the process returns to block 616. If the authentication controller or PMD loses power and/or restarts as determined at block 630, the process then determines whether or not the PMD supports CTA at block 632. For instance, if the authentication controller has retained in cache that the PMD supports CTA, then process 600 returns to block 616; if the authentication controller has not retained in cache that the PMD supports CTA, then the process returns to block 606.

Figure 7:
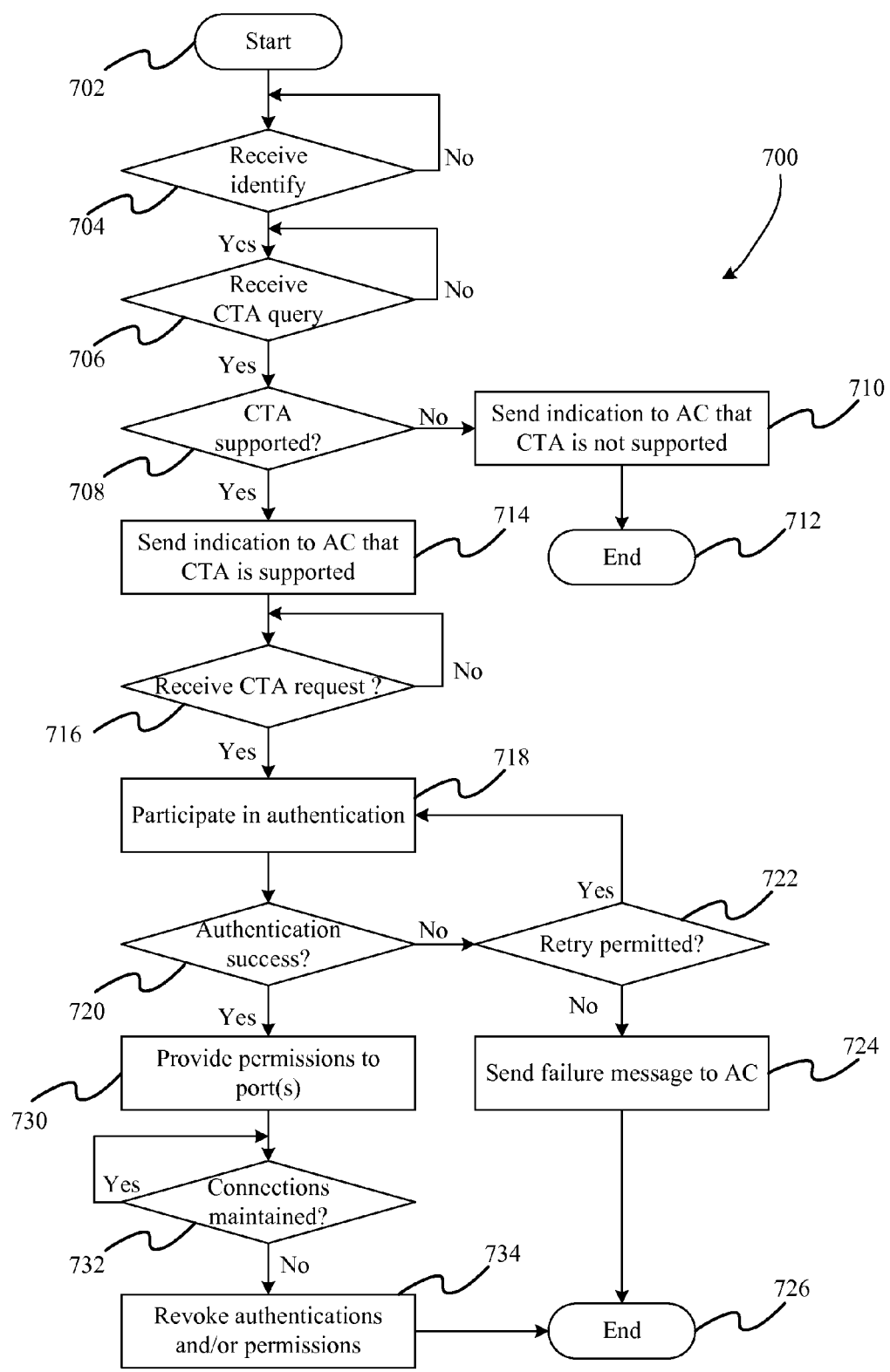
FIG. 7 is a flowchart showing a PMD establishing cross-transport authentication from an AC according to one embodiment.

FIG. 7 is a flowchart showing a PMD establishing cross-transport authentication from an AC according to one embodiment. Process 700 starts at block 702 when the PMD receives an identify request from an AC through a requesting port, at block 704. In some embodiments, the PMD may respond with an acknowledgment message. At block 706, the PMD waits until a CTA query is received. The PMD may then determine whether CTA is supported at block 708. If CTA is not supported by the PMD, then an indication is sent to the AC at block 710 and process 700 ends at block 712. (The PMD may continue other communication with the AC after process 700 ends.) If CTA is supported as determined at block 708, then an indication the CTA is supported is sent to the authentication controller at block 714. The PMD then waits until a CTA request is received from the AC at block 716. The port via which the AC communicates the CTA request to the PMD becomes the requesting port for the operation.

At block 718, the PMD may participate in authentication of the authentication controller. Authentication may require further information and/or processes from the authentication controller, e.g., as described above or as described below with reference to FIG. 10. If the authentication is not successful, at block 720, the PMD determines whether retry is permitted at block 722. In some embodiments, authentication may only be requested once; in that case, retry is not permitted. A failure message is sent to the authentication controller at block 724 and process 700 ends at block 726. In other embodiments the PMD may allow one or more retries at block 722 or may allow retries to continue until some time period has elapsed. If the limit on retries has not been reached, process 700 returns to block 718; otherwise, a failure message is sent to the authentication controller at block 722.

If authentication is successful at block 720, then permissions are provided to the requesting and the destination ports at step 730. In some embodiments, both ports may receive the same permissions. In other embodiments, the ports may receive different permissions. In other embodiments, the destination port may only receive those permissions that were requested by an accessory and provided to the requesting port as a result of authentication at block 718. That is, the destination port, in some embodiments, may not be granted more permissions than the requesting port. Once the permissions have been granted, the PMD may then be controlled and/or accessed by an accessory through the destination port in accordance with the granted permissions.

Process 700 may monitor whether either the accessory or the authentication controller has been disconnected from the PMD at block 732. If either or both the authentication controller and/or the accessory have been disconnected, then the authentication and/or permissions may be revoked at block 734 and process 700 ends at block 726. Alternatively, the PMD may send a request to the accessory and/or the AC to reidentify themselves, and process 700 can return to block 704 to await the re-identification. In some embodiments, if the accessory is disconnected, permissions and/or authentications for the requesting port are not revoked at block 734; only permissions and/or authentication at the destination port are revoked.

Figure 8:
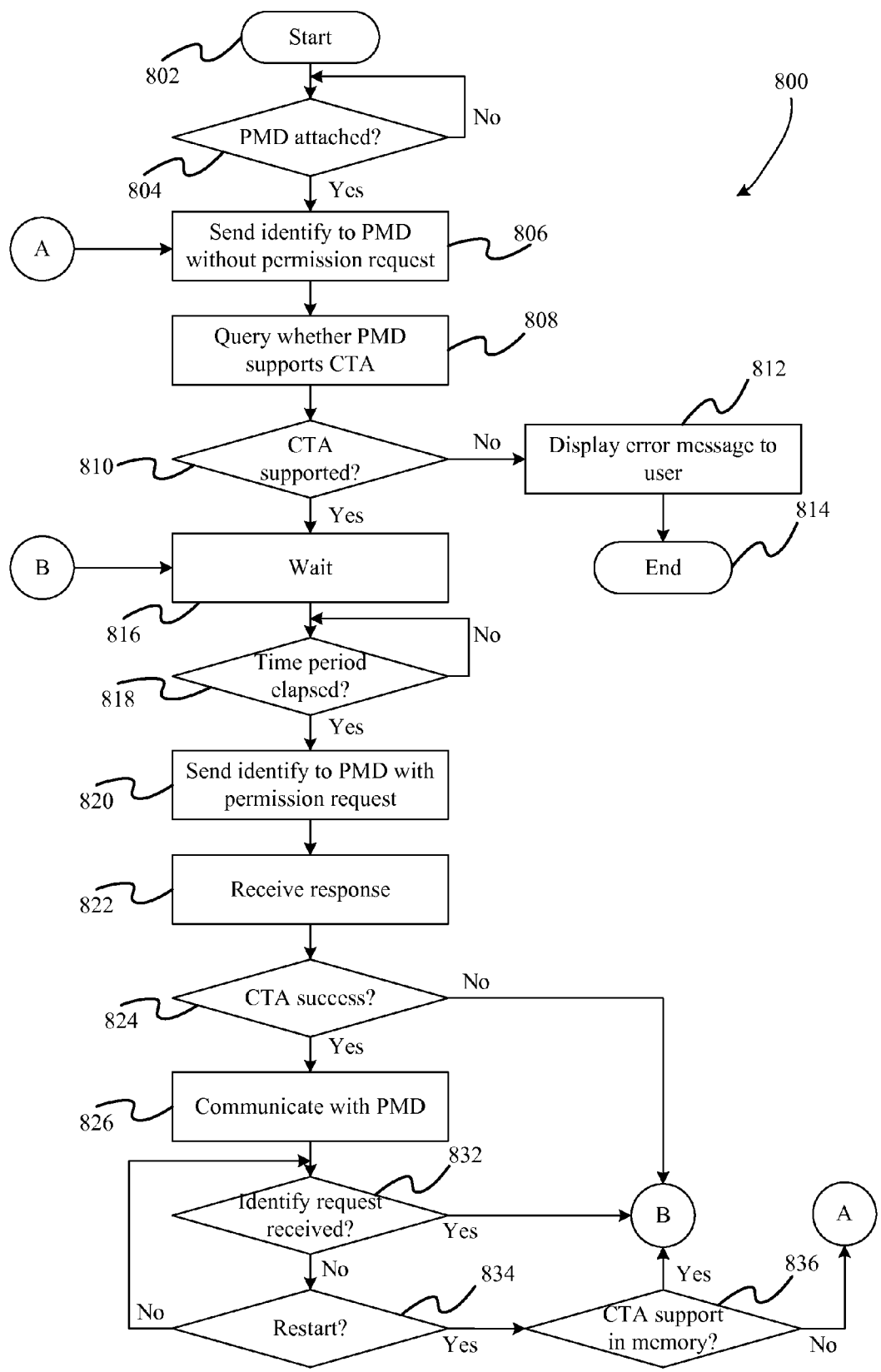
FIG. 8 is a flowchart showing an accessory device making a request for cross-transport authentication from a PMD according to one embodiment.

FIG. 8 is a flowchart showing a process 800 that an accessory device can use to make a request for cross-transport authentication from a PMD according to one embodiment. Process 800 begins at block 802 and determines whether the accessory is connected with a PMD at block 804. If so, the accessory sends an identify message to the PMD at block 806 through its communication port (which will be the destination port for the CTA operation). The identify message, in some embodiments, may not include a permission request. At block 808, the accessory queries the PMD to determine if the PMD supports CTA. At block 810, the process 800 determines whether CTA is supported at the PMD. The determination at block 810 may be similar to the determination made at block 610 in FIG. 6. If CTA is not supported, an error message may be displayed to the user from the accessory at block 812, and process 800 ends at block 814. In some embodiments, it may not be possible to display an error message to a user; in such embodiments, block 812 may be skipped.

Once it is determined that the PMD supports CTA, the accessory waits for a set period of time at blocks 816 and 818. This period of time can be sufficiently long to allow the authentication controller time to authenticate itself with the PMD using process 600 of FIG. 6. In some embodiments, this period of time may be about 500 ms; however, the time period may be any period of time. Once the time period has elapsed at block 818, an identify with a permission request is sent to the PMD, thereby requesting a set of permissions for the accessory, at block 820. This identify at block 820 may also identify the port with which it is connected as a destination port and identify which port is the requesting port.

At block 822, the accessory receives a response from the PMD; the response can indicate whether the requesting port successfully authenticated using CTA. If authentication between the authentication controller and the PMD is not successful as determined at block 824, then process 800 returns to block 816. If CTA authentication between the authentication controller and the PMD is successful as determined at block 824, the accessory communicates and/or controls the PMD through the destination port using the granted permissions at block 826.

If the PMD sends a request to re-identify the accessory at block 832, process 800 returns to block 816. If the authentication controller or PMD loses power and/or restarts as determined at block 834, the process then determines whether or not the PMD supports CTA at block 836. For instance, if the accessory has retained in cache that the PMD supports CTA, then process 800 returns to block 816; if the accessory has not retained in cache that the PMD supports CTA, then the process returns to block 806.

Figure 9:
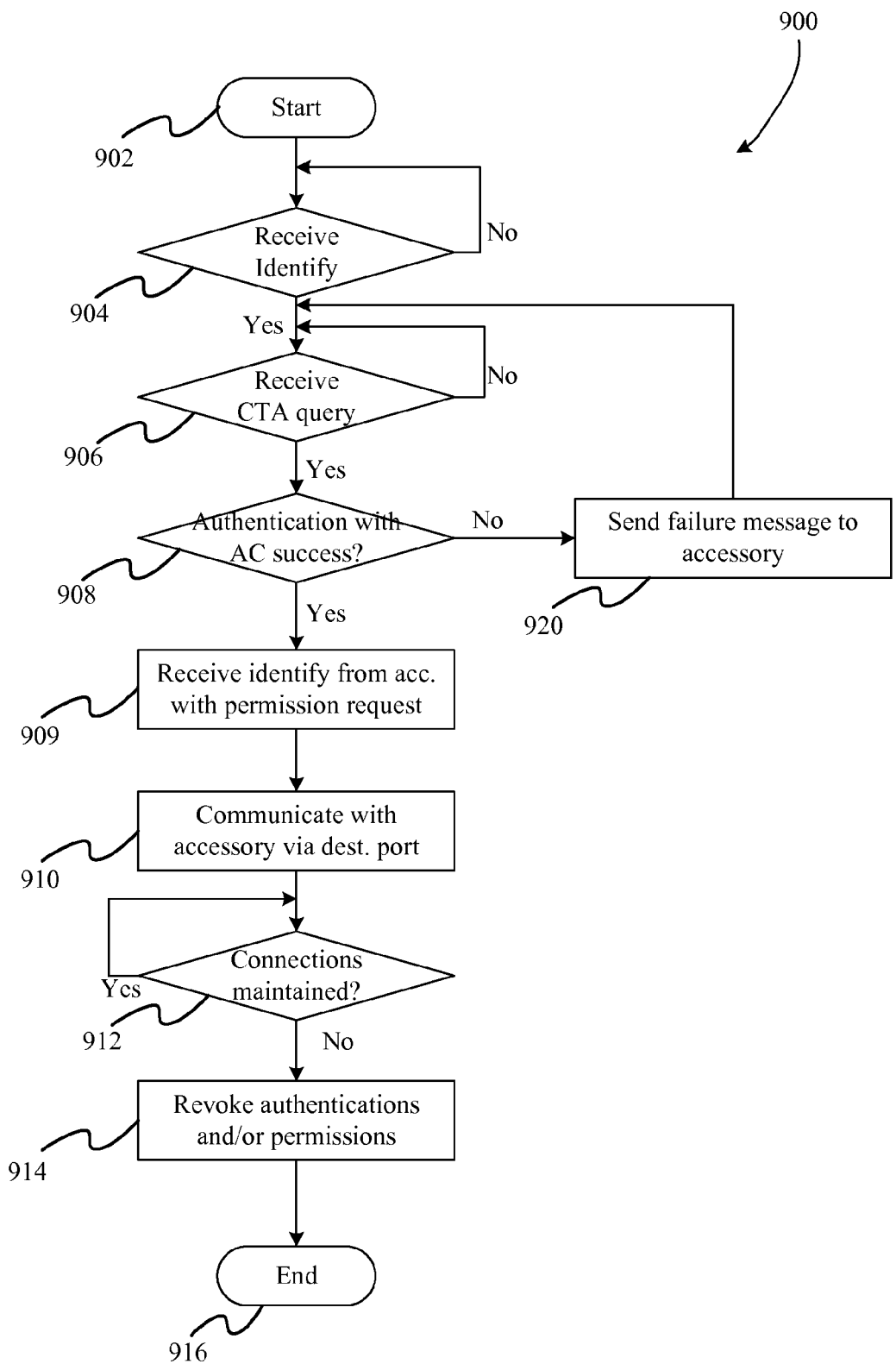
FIG. 9 is a flowchart showing a PMD establishing cross-transport authentication with an accessory device according to one embodiment.

FIG. 9 is a flowchart showing a process 900 that a PMD can use to establish cross-transport authentication with an accessory device according to one embodiment. Process 900 starts at block 902 with the PMD waiting for an identify message from the accessory through the destination port at block 904. When an identify is received, in some embodiments, the PMD may send an acknowledgement message in return. At block 906, the PMD waits for a CTA query from the accessory. Once the CTA query is received, the PMD, for example, may determine whether CTA is supported and communicate CTA support status with the accessory. Meanwhile, the PMD may be authenticating the authentication controller (e.g., using process 700 of FIG. 7 described above). If such authentication is not successful at block 908, then a failure message can be sent to the accessory at block 920, and process 900 can return to block 906 to await a further CTA query. After some period of time, the accessory may send an identify message with a request for particular permissions at block 909. In some embodiments, the set period of time can correspond to the time period required to authenticate the authentication controller as described above. If the ports associated with the permission request correspond to the ports authenticated with the authentication controller (and in some embodiments, if the permissions requested by the accessory correspond to permissions granted to the authentication controller), the accessory may control the PMD and/or communicate with the PMD through the destination port according to the granted permissions at block 910.

Connection between the PMD and the accessory continues at block 912. If the connection is maintained, communication and/or control of the PMD through the destination port may continue indefinitely. However, if connections are not maintained, then authentications and/or permissions may be revoked at block 914 and process 900 can end at block 916. For example, if the PMD loses power or otherwise resets, it may revoke all authentications and/or permissions that existed prior to this occurrence and require the accessory and/or authentication controller to reidentify (retuning to block 904) in order to re-establish the permissions.

FIG. 10 shows an example of an authentication process 1000 between a PMD 102 and an authentication controller 180 according to one embodiment. Process 1000, for example, may be implemented partially or wholly at block 618 in FIG. 6 and/or at block 718 in FIG. 7. Process 1000 starts at block 1002 in a PMD 102. A random number is generated at block 1004, for example, using a random number generator. The random number may be sent to authentication controller 180 at block 1006. Authentication controller 180 may receive the random number at block 1008 and retrieve a private key at block 1010. The private key, for example, may be retrieved from memory within the authentication controller. The random number is then encrypted at block 1012 and sent back to the PMD at block 1014. In some embodiments, the authentication may also communicate device identifying information to the PMD with the encrypted random number or with other messages.

The encrypted random number is received at the PMD at block 1016. A public key is retrieved from memory within the PMD at block 1018. The public key can be retrieved, e.g., based on device identifying information provided by the accessory either with the encrypted random number or in another previous message. The random number is decrypted at block 1020. If the decrypted random number is the same as the random number generated in block 1004, as determined in block 1022, then authentication succeeds at block 1024. If the decrypted random number is not the same as the random number generated in block 1004, as determined in block 1022, then authentication fails at block 1026. Other authentication processes can be used. For example, in one embodiment, the authenticating device (e.g., authentication controller 180) can provide a digital certificate together with device class information prior to providing the encrypted random number to PMD 102. PMD 102 can compare the digital certificate to certificate information stored in its own memory in association with the device class information. If the certificate information does not match, then the authentication fails regardless of whether a decrypted random number matches the random number sent to authentication controller 180 at block 1006. (In some embodiments, if the certificate test fails, the random number test need not be initiated.)

In some embodiments, PMD 102 may be required to detect the presence of the authentication controller within the interface system in order to proceed with cross-transport authentication. In other embodiments, the portable media device may periodically confirm whether the authentication controller is coupled with the portable media device through the requesting port in order to continue authenticated use of the destination port.

In some embodiments, the portable media device may be required to detect the presence of both the authentication controller on the source/requesting port and the accessory device on the destination port in order to proceed with cross-transport authentication. In other embodiments, the portable media device may periodically confirm whether the authentication controller is coupled with the portable media device through the requesting port in order to continue authenticated use of the destination port.

In some embodiments, the authentication controller may only request cross-transport authentication on behalf of a single destination port. In other embodiments, permissions from the requesting port are transferred to the destination port only if the destination port is connected when the permissions are granted to the requesting port. In yet other embodiments, permissions granted to the requesting port are transferred to the destination port only if the destination port requests cross-transport privileges. Moreover, in some embodiments, permissions are transferred only if the destination port's request specifies the requesting port as a source of permissions and the requesting port's request specifies the destination port as an intended recipient of permissions.

In some embodiments, when permissions granted to the requesting port are transferred to the destination port, both ports may thereafter use the transferred privileges. In other embodiments, both ports may continue to use the permissions.

In some embodiments, authentications and/or permissions granted to both the source and destination ports may be lost when the portable media device is powered off, enters hibernation, is shut down, enters a sleep mode, and/or when it awakes. In other embodiments, authentications and/or permissions at the destination port and/or the requesting port may be lost when either the destination port and/or the requesting port becomes detached. In some embodiments, authentications and/or permissions may be lost when the accessory connected via the destination port and/or the authentication controller connected via the requesting port reidentifies itself. Moreover, in other embodiments, if the destination port attempts to authenticate itself then all cross-transport authentication permissions are revoked.

In some embodiments, the destination port and requesting port may be used asynchronously during startup, authentication, and after permissions have been granted using cross-transport authentication. Thus, direct communication between the requesting port and the destination port is not required.

In some embodiments, an interface that supports cross-transport authentication can be designed such that the authentication controller always uses the same port as the requesting port and always specifies the same port as the destination port. In other embodiments, port assignments for requesting and destination ports can be configurable such that any two ports of a particular PMD can be used.

In some embodiments, an accessory device may display status information to a user. For example, as described above, if cross-transport authentication fails, the accessory may display a message stating, for example, that the accessory is not supported or is unauthorized. In other embodiments, the destination port may request authentication permissions prior to a successful cross-transport authentication without displaying a message indicating the accessory is unsupported and/or unauthorized.

In some embodiments, if a destination port has been authorized using cross-transport authentication, and a new cross transport authentication request is received through the same or a new requesting port, the authentications and/or permissions of the destination port are revoked; new authentications and/or permissions based on the outcome of the new request can be established for the same destination port or a different destination port. In other embodiments, the new permissions override the existing permissions only if the new authentication is successful. In some embodiments, a new cross transport authentication request can specify the same destination port that is currently in use. In such an embodiment, the new successful cross-transport authentication may provide new permissions to the destination port in addition to the permissions previously provided to the destination port; in other embodiments, the previously provided permissions are revoked, and only the new permissions are granted to the destination port. In some embodiments, permissions are revoked only if the requesting port for the new request is different from the previous requesting port.

In some embodiments, a request for cross-transport authentication may be denied if the requesting port identifies itself as the destination port. In other embodiments, a request for cross-transport authentication of destination ports that are unsupported by the mobile computing device or to which nothing is presently attached may be denied.

In some embodiments, when authentication and/or permissions have been revoked from a destination port, an accessory connected via the destination port may request that the permissions be reestablished by sending a request to the portable media device through the destination port. Once this request is received at the portable media device, a new request for CTA may be sent to the authentication controller through the requesting port. In some embodiments, such request sent by the portable media device may revoke any permissions currently granted to the requesting port.

In some embodiments, the source port (or the device connected thereto) can reserve certain permissions to itself during cross-transport authentication. Such permissions are not transferred to the destination port. For example, if the portable media device functionality is accessed using commands that are grouped into various "lingoes," permissions may be granted separately for each lingo. The source port may specify one or more of these lingoes as being reserved for the source port or the device connected thereto (e.g., using a particular command or command parameter) when initiating CTA. The PMD can respect this specification and not transfer privileges for those lingoes to the destination port. Where this is the case, commands in the non-transferred lingoes may be accepted on the source port but not on the destination port.

Figure 11:
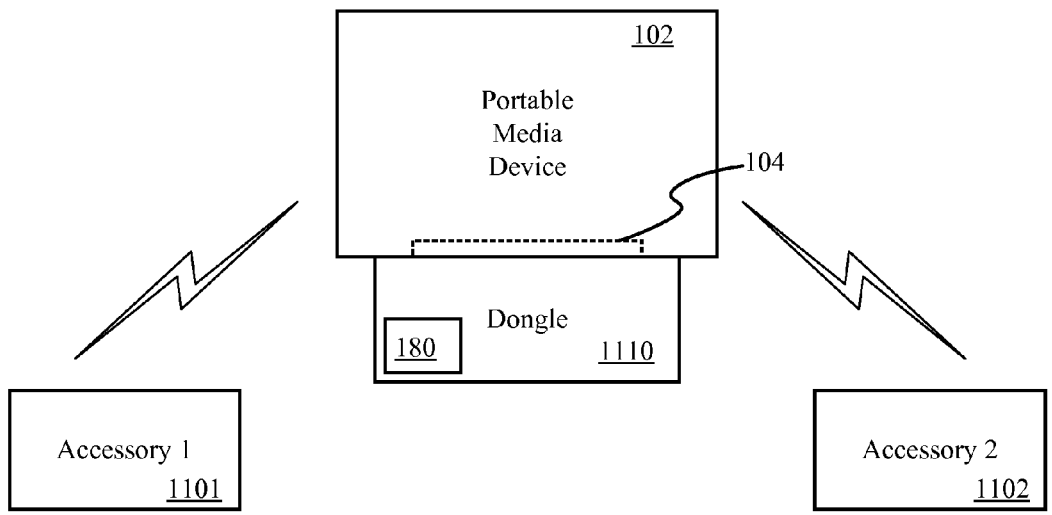
FIG. 11 shows a block diagram of a PMD physically coupled with an authentication dongle and wirelessly coupled with two accessories according to one embodiment.

In some embodiments, cross transport authentication can be used to authenticate multiple accessories. FIG. 11 shows a block diagram of PMD 102 physically coupled with dongle 1110 and wirelessly coupled with accessory 1 1101 and accessory 2 1102 according to some embodiments of the invention. While the accessories in this embodiment are wirelessly coupled with PMD 102, the accessories can be physically coupled. Dongle 1110, in this embodiment, is shown physically coupled with PMD 102 using connector interface 104. Any type of physical and/or wireless connection (e.g., an input/output interface) can be used; for example, dongle 1110 can be coupled with PMD 102 using a universal serial bus and/or using an asynchronous connection (e.g., using special purpose pins). In some embodiments, dongle 1110 can be wirelessly coupled with PMD 102. Dongle 1110 can include authentication controller 180 that can be used to establish authentication on behalf of accessory 1 1101 and/or accessory 2 1102 as well as other wired or wireless accessories. Dongle 1110 can also include a housing within which the authentication controller 180 is disposed and a connector is at least partially disposed. Accessory 1 1101 and accessory 2 1102 can be wirelessly connected with PMD 102 using any type of wireless protocol (e.g., Bluetooth or Wi-Fi). Wireless ports can be established for both accessories. While two wireless accessories are shown, three or more wireless accessories can be in communication with PMD 102 and can be authenticated using dongle 1110. In some embodiments, either or both accessory 1 1101 or accessory 2 1102 can be in communication with PMD 102 through a wired port.

Authentication controller 180 or other electronics within dongle 1110 can request "cross-transport" authentication through a requesting port of PMD 102 and can specify that authentication privileges established via the requesting port are to be shared with or transferred to one or more wireless ports (also referred to as a "destination port"), to which accessory 1 1101 and/or accessory 2 1102 are connected. The cross-transport authentication request can include, for example, an identifier identifying the destination port and/or an indication that authentication is provided for ports of a certain type (e.g., Wi-Fi, Bluetooth, wired, wireless, etc.). Portable media device 102 can perform an authentication process in conjunction with authentication controller 180 over the requesting port, and based on the result of this process, portable media device 102 may grant various permissions to the requesting port. During a cross-transport authentication, once authentication completes on the requesting port, some or all of the permissions thereby granted may be replicated or transferred to a wireless port that is wirelessly coupled with accessory 1 1101 and/or a wireless port that is wirelessly coupled with accessory 2 1102.

Consequently, the nature and degree of the interactions between dongle 1110, accessory 1 1101, and/or accessory 2 1102 and portable media device 102 can be controlled. For example, in some embodiments, upon successful authentication, portable media device 102 may consider dongle 1110, accessory 1 1101 and/or accessory 2 1102 to be trusted partners that are permitted to access functions, features and/or operations of PMD 102, as well as send and/or receive data from PMD 102. On the other hand, if PMD 102 determines that dongle 1110, accessory 1 1101, and/or accessory 2 1102 are not trusted partners (e.g., because authentication with authentication controller 180 fails), then PMD 102 can prevent or limit interactions with dongle 1110, accessory 1 1101, and/or accessory 2 1102. Dongle 1110 itself, for example, may also be considered an accessory device for portable media device 102. In some embodiments, in the event authentication with authentication controller 180 fails, accessory 1 1101, accessory 2 1102 and/or dongle 1110 may be able to interact with PMD 102 in a limited fashion.

Figure 12:
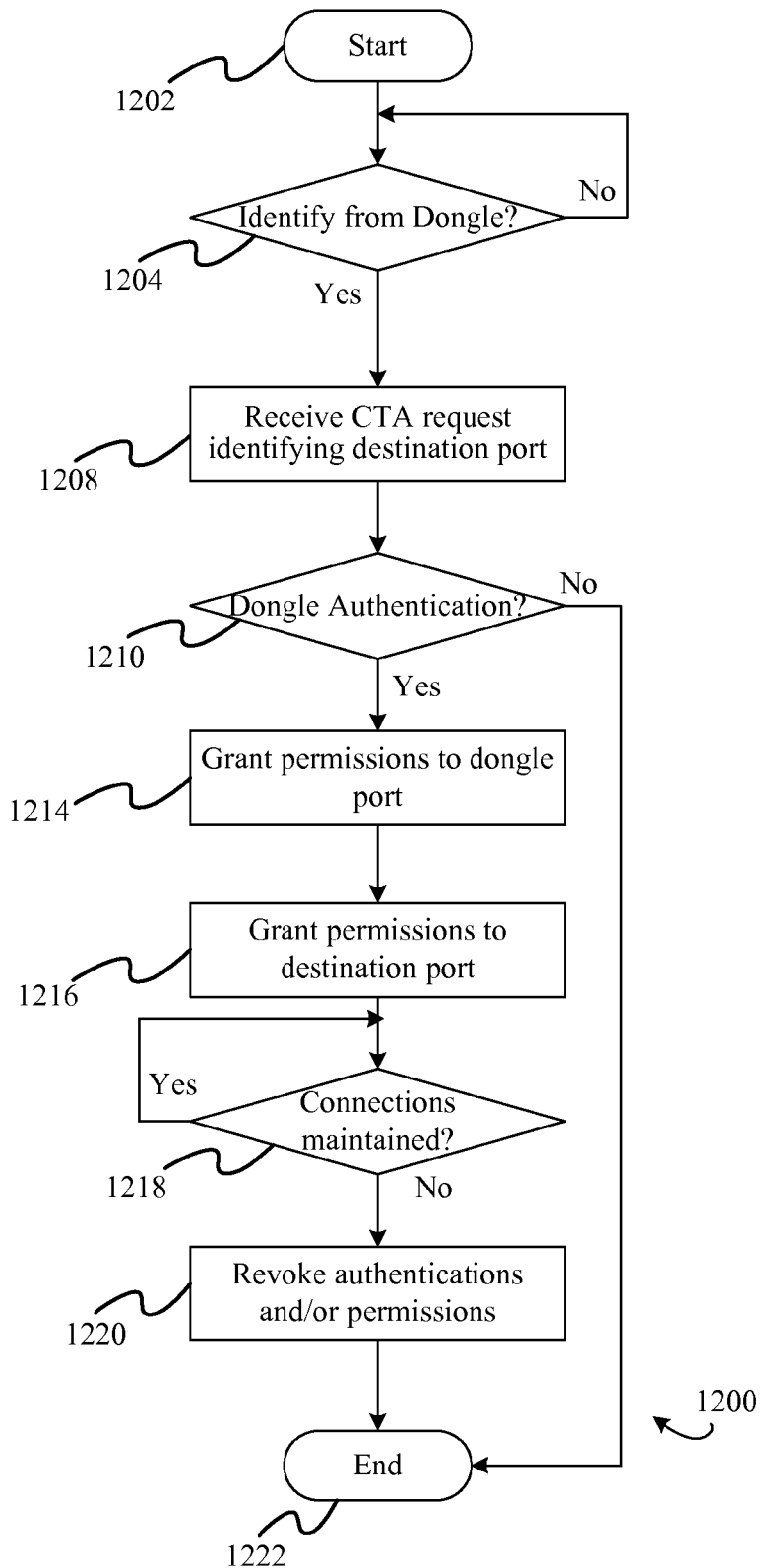
FIG. 12 is a flowchart showing an accessory being authenticated using an authentication dongle according to one embodiment.

FIG. 12 is a flowchart of a process 1200 showing two accessories being authenticated using a dongle according to one embodiment. Process 1200 can be performed by PMD 102 shown in FIG. 11. The two accessories, for example, can be accessory 1 1101 and/or accessory 2 1102 and the dongle can be dongle 1110 of FIG. 11. The accessories and/or dongle can be physically coupled with PMD 102 and/or wirelessly coupled with PMD 102. Process 1200 starts at block 1202. At block 1204 PMD 102 can receive an identify message from dongle 1110 through a requesting port. In some embodiments, the PMD may respond to the dongle 1110 with an acknowledgment message. The identify message can include a dongle device identifier.

A CTA request can then be received from dongle 1110 at block 1208. The CTA request, in this embodiment, can identify an accessory port (or ports) as the destination port for cross-transport authentication. For example, dongle 1110 can identify a Bluetooth port and/or a Wi-Fi port as a destination port. At block 1210 PMD 102 can authenticate dongle 1110 using any authentication scheme. If authentication fails at block 1210, then process 1200 ends at block 1222. If authentication is successful at block 1210, then process 1200 can grant permissions to the communication port coupled with dongle 1110 at block 1214. Permissions can then be granted and/or transferred to the destination port (or ports) identified by the dongle in the CTA request at block 1216. In some embodiments, the destination port can be a wired port(s) or a wireless port(s). In some embodiments, the permissions granted and/or transferred to the accessory port(s) can include all the permissions granted to the port coupled with dongle 1110 or a subset of the permissions. Thus, a dongle can be used to provide authentication for any number of accessories coupled with the PMD as long as the accessories are coupled with the destination port or ports identified by the dongle in the CTA request.

Process 1200 may monitor whether accessories or dongle 1110 have been disconnected from the PMD at block 1218. If either or both dongle 1110 and/or accessory (or accessories) have been disconnected, then the authentication and/or permissions may be revoked at block 1220 and process 1200 ends at block 1222. Alternatively, the PMD may send a request to the accessory and/or the dongle to reidentify themselves, and process 1200 can return to block 1204 to await the re-identification. In some embodiments, if the accessory is disconnected, permissions and/or authentications for the requesting port are not revoked at block 1220; only permissions and/or authentication at the destination port are revoked.

Figure 13:
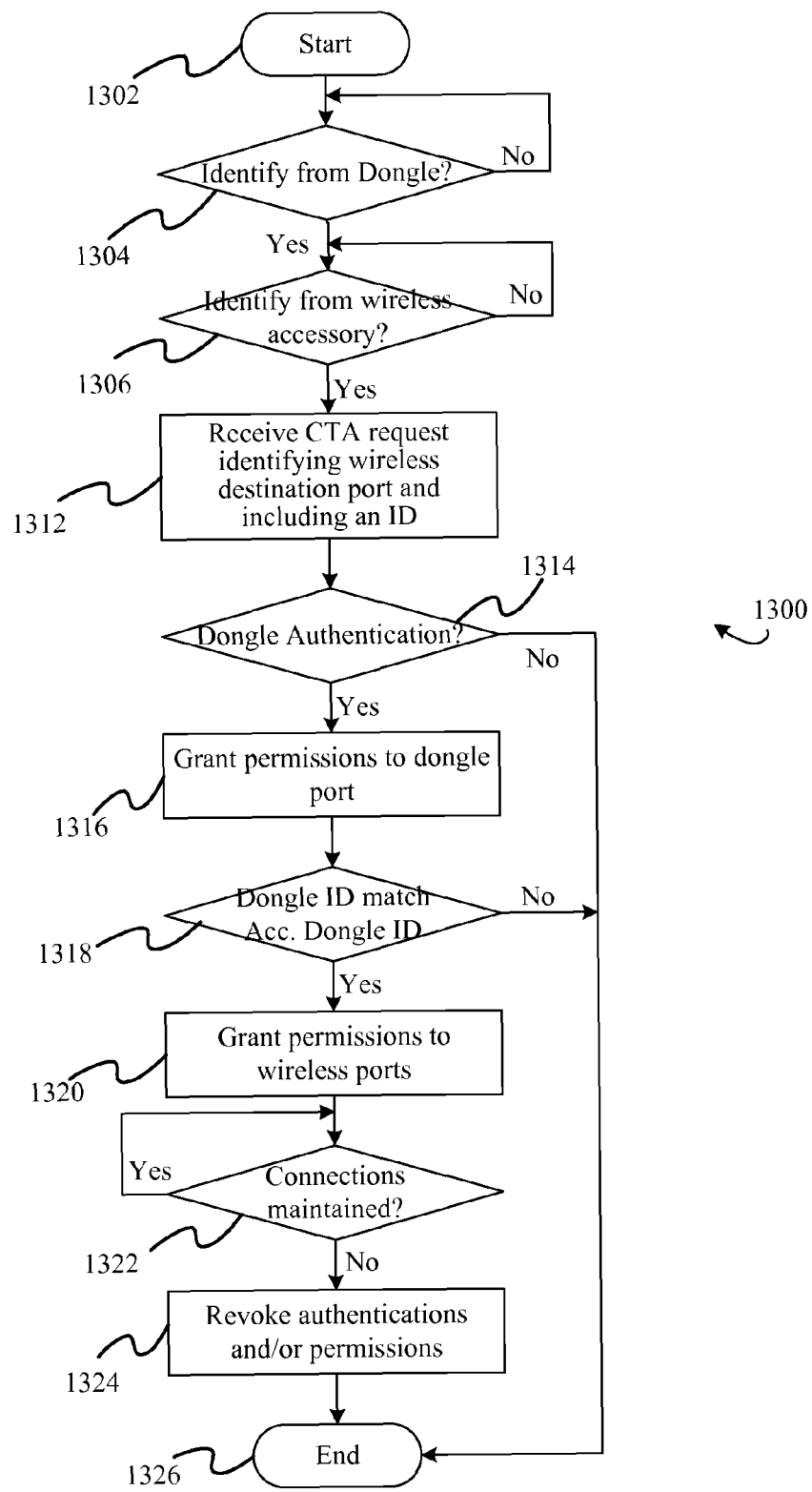
FIG. 13 is another flowchart showing an accessory being authenticated using an authentication dongle according to one embodiment.

Various modifications to process 1200 can be implemented. For example, FIG. 13 shows process 1300 that uses an identifier from the dongle to limit the destination ports authenticated by cross-transport authentication. Process 1300 begins at block 1302. At block 1304 dongle 1110 can send an identify message. At block 1306 the accessory can likewise send an identify message. The identify message, for example, can include an identifier that can be used to limit cross transport authentication to only those devices with a matching identifier. If it is, at block 1312 the PMD can receive a cross transport authentication request from the dongle that specifies an accessory destination port (e.g. a wireless port) and/or can include an identifier. The identifier can be used to limit the types of accessories with which cross-transport authentication can be used. For example, the PMD can allow cross transport authentication for ports coupled with specific accessories, specific accessory types, specific accessory models, or accessories from a specific manufacturer that match the identifier presented by the dongle in the cross-transport authentication request.

At block 1314 the dongle can be authenticated through the dongle port. If authentication is successful, then permissions can be granted to the dongle port at block 1316. The identifier received from the dongle and the identifier received from the accessory (or accessories) can be compared at block 1318. If the identifiers do not match, then process 1300 ends at block 1326. If the identifiers match, then some or all permissions can be granted and/or transferred to the accessory port used by the accessory at block 1320. Blocks, 1322, 1324, and 1326 correspond with blocks 1218, 1220, and 1222 of FIG. 12. Using matched identifiers to confirm that a dongle and accessory are compatible can provide low level security. It does not limit an accessory's capability to use cross transport authentication with a dongle that has a matching identifier.

In another embodiment, the PMD can include a lookup table that includes dongle identifiers (or codes) that are associated with specific accessory identifiers that the dongle is allowed to authenticate. The PMD can then allow CTA for only those accessories with identifiers associated with the dongle identifiers in the lookup table.

Figure 14:
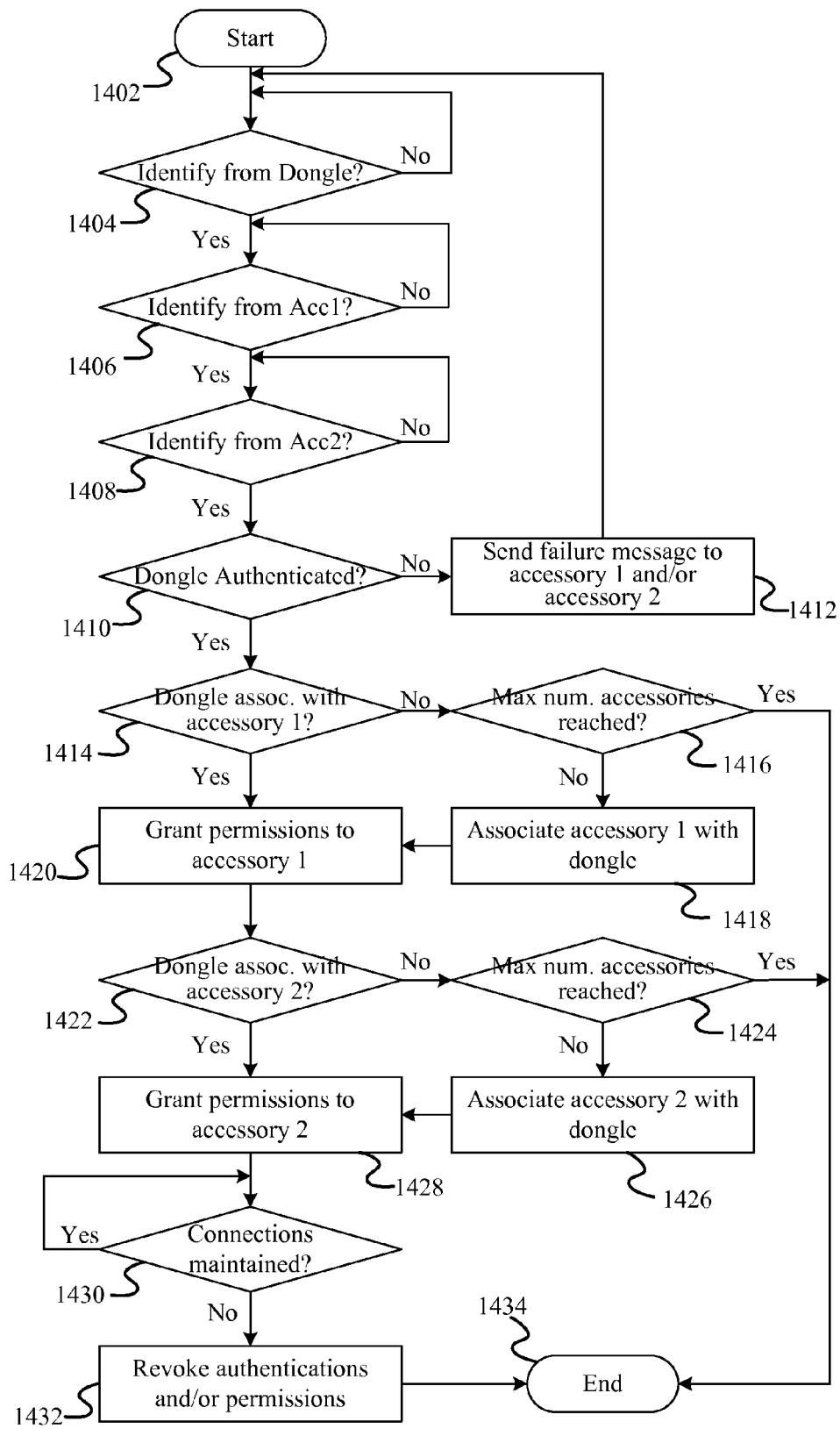
FIG. 14 is another flowchart showing an accessory being authenticated using an authentication dongle according to one embodiment.

FIG. 14 is a flowchart showing process 1400 of multiple accessories being authenticated using dongle 1110 according to one embodiment. Process 1400 begins at block 1402. An identify message can be sent from dongle 1110 at block 1404, from accessory 1 1101 at block 1406, and from accessory 2 1102 at block 1408. In some embodiments, identification messages can be sent in any order. At block 1410 the dongle can be authenticated using any type of authentication scheme, for example, in conjunction with authentication controller 180. During authentication, permissions can be granted to the dongle 1110 and/or the PMD port with which the dongle is coupled. If authentication fails, a failure message, in some embodiments, can be sent to either or both accessory 1 or accessory 2 at block 1412 and then process 1400 can return to block 1404.

At block 1414, process 1400 determines whether the dongle is associated with accessory 1 1101. In some embodiments, a specific dongle can be associated with a limited number of accessories or types of accessories. A lookup table stored in memory at PMD 102 (or in memory at dongle 1110) can be used to associate supported accessories with the authentication controller. For example, the lookup table can contain unique identifiers associated with an authentication controller or dongle that is associated or listed with supported accessory or accessories. In some embodiments, a dongle can be originally associated with zero or a limited number of accessories, and the table can be updated as the dongle becomes associated with different accessories by authenticating for them using CTA.

If accessory 1 1101 is associated with dongle 1110, then some or all permissions can be transferred and/or granted to accessory 1 1101 at block 1420. If accessory 1 1101 is not associated with dongle 1110, then process 1400 can determine whether the dongle has been associated with the maximum number of accessories available for the dongle at block 1416. If it has, then process 1400 ends at block 1434. In some embodiments, the user of the PMD can be prompted to purchase a license to increase the maximum number of accessories associated with dongle 1110. In such embodiments, process 1400 can return to block 1422. If the maximum number of accessories available for the dongle has not been reached, at block 1416, then accessory 1 1101 can be associated with dongle 1110 at block 1418. In some embodiments, accessory 1 1101 can be associated with dongle 1110 in a lookup table stored either at the dongle or at the PMD. For example, a dongle identifier and/or an accessory identifier can be stored in the lookup table to associate an accessory with a dongle. Permissions can then be granted to accessory 1 1101 at block 1420. These permissions can include all or a subset of the permissions granted to dongle 1110 at block 1410.

At block 1422, process 1400 determines whether the dongle is associated with accessory 2 1102. If accessory 2 1102 is associated with dongle 1110, then some or all permissions can be transferred and/or granted to accessory 2 1102 at block 1422. If accessory 2 1102 is not associated with dongle 1110, then process 1400 can determine whether the dongle has been associated with the maximum number of accessories available for the dongle at block 1424. If it has, then process 1400 ends at block 1434. In some embodiments, the user of the PMD can be prompted to purchase a license to increase the maximum number of accessories associated with dongle 1110. In such embodiments, process 1400 can return to block 1414. If the maximum number of accessories available for the dongle has not been reached, at block 1424, then accessory 2 1102 can be associated with dongle 1110 at block 1426. In some embodiments, accessory 2 1102 can be associated with dongle 1110 in a lookup table stored either at the dongle or at the PMD. For example, a dongle identifier and/or an accessory identifier can be stored in the lookup table to associate an accessory with a dongle. Permissions can then be granted to accessory 2 1102 at block 1428. These permissions can include all or a subset of the permissions granted to dongle 1110 at block 1410.

Process 1400 may monitor whether accessory 1 1101, accessory 2 1102, and/or dongle 1110 have been disconnected from the PMD at block 1430. If dongle 1110 or accessories 1101, 1102 have been disconnected, then the authentication and/or permissions may be revoked at block 1432 and process 1400 ends at block 1434. Alternatively, the PMD may send a request to the accessory and/or the dongle to reidentify themselves, and process 1400 can return to block 1404 to await the re-identification. In some embodiments, if the accessory is disconnected, permissions and/or authentications for the requesting port are not revoked at block 1432; however permissions and/or authentication at the destination port can be revoked. When a dongle authenticates for a different accessory that association is added to the lookup table. Moreover, associations between accessories and dongles can persist after the accessory and/or dongle disconnects. Thus, the dongle can be limited to a max number of accessories over the lifetime of the dongle and not simply limited to concurrently connected accessories.

Referring back to FIG. 11, once accessory 1 1101 and accessory 2 1102 are authenticated using cross transport authentication (e.g., using methods described in FIGS. 12-14), both accessory 1 1101 and accessory 2 1002 can interoperate with PMD 102 depending on the permissions granted. Moreover, accessory 1 1101 and accessory 2 1102 can communicate and/or interoperate with each other. For example, a communication channel can be created through PMD 102 that allows accessory 1 1101 and accessory 2 1102 to communicate with each other. In some embodiments, an application can be executed at PMD 102 that provides the communication channel between accessory 1 1101 and accessory 2 1102.

Figure 15:
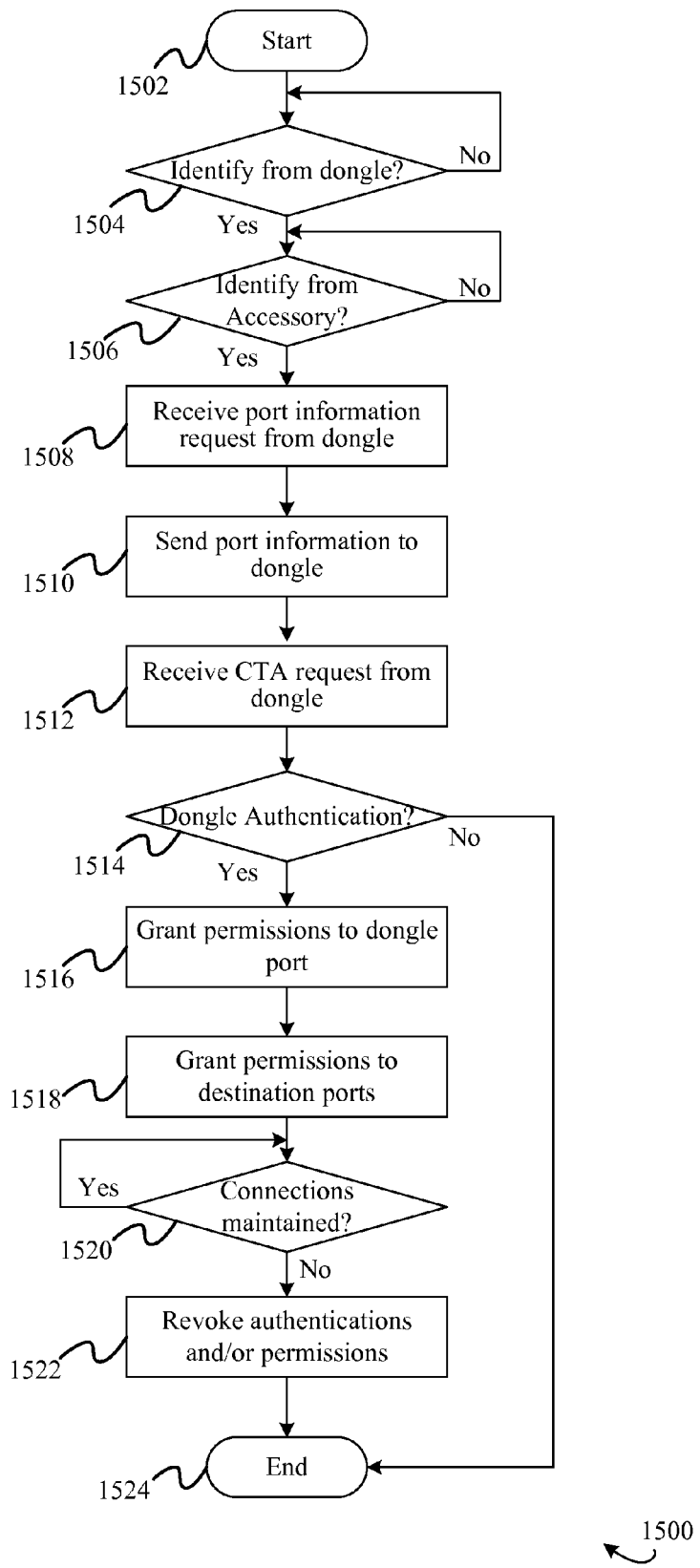
FIG. 15 is another flowchart showing a process for cross-transport authentication of an accessory according to one embodiment.

FIG. 15 shows another flowchart of a process for cross-transport authentication of an accessory. Process 1500 starts at block 1502. An identify message can be sent from a dongle at block 1504, and from an accessory at block 1506. In some embodiments, identification messages can be sent in any order. The identify message from the accessory can include an identifier that identifies the accessory. For example, the identifier can identify the type of accessory, the accessory manufacturer, and/or the accessory model. The PMD can associate the identifier with the port the accessory is coupled with, for example, in an accessory lookup table or other memory location (e.g., storage device 325 shown in FIG. 3).

At block 1508, the dongle can send a port information request message. The port information request message can request information regarding accessories and accessory types coupled with the PMD. In some embodiments, the port information request message can request port connectivity information for only certain accessories, accessory types, accessory models, and/or accessories from a specific manufacturer. In some embodiments, the port information request message can include an identifier that identifies accessories, accessory types, accessory models, and/or accessory manufacturers that are supported by the dongle, the PMD can determine whether the identifier received from the dongle matches an identifier from a connected accessory(s), for example, by looking up accessory identifiers in the accessory lookup table. If a match occurs, PMD can send information to the dongle identifying the communication port where the matching accessory is coupled at block 1510. In other embodiments, at block 1510, the PMD can simply send accessory identifiers and ports to the dongle to allow the dongle to determine which, if any, ports are coupled with approved or compatible accessories.

At block 1512, the dongle can send a cross-transportation authentication request that identifies the destination port to which an approved (or matched) accessory is connected. In some embodiments, the destination port included in the cross-transport authentication request can include any or all of the ports identified by the PMD at block 1510. In other embodiments, the dongle can skip blocks 1508 and 1510 and send (at block 1512) an identifier with the cross-transport authentication request that includes an identifier and/or identifiers of accessories for which the dongle can provide cross-transport authentication. The PMD can use the identifier to determine the port or ports connected to an accessory or accessories that match the identifier. Cross transportation authentication can then proceed with these destination ports.

At block 1514 the PMD can authenticate the dongle using any authentication scheme. If authentication fails at block 1514, then process 1500 ends at block 1524. If authentication is successful at block 1514, then process 1500 can grant permissions to the communication port coupled with the dongle at block 1516. At block 1518, permissions can be granted and/or transferred to the accessory port(s) that were identified in the CTA request (or, in some embodiments, to the destination ports identified by the PMD based on accessory identifiers in the CTA request). In some embodiments, the permissions granted and/or transferred to the accessory port (s) can include all the permissions granted to the port coupled with the dongle or a subset of the permissions.

Process 1500 can monitor whether the accessories or the dongle have been disconnected from the PMD at block 1520. If either or both the dongle and/or the accessory (or accessories) have been disconnected, then the authentication and/or permissions can be revoked at block 1522 and process 1500 ends at block 1524. Alternatively, the PMD may send a request to the accessory and/or the dongle to reidentify themselves, and process 1500 can return to block 1504 to await the re-identification. In some embodiments, if the accessory is disconnected, permissions and/or authentications for the requesting port (or the dongle) are not revoked at block 1522; only permissions and/or authentication at the destination port are revoked.

Specific details are given in the above description to provide a thorough understanding of using cross-transport authentication to authenticate an accessory device. However, it is understood that the embodiments may be practiced without specific details. For example, circuits, structures, and/or components may be shown in block diagrams in order not to obscure the embodiments in unnecessary detail. In other instances, well-known circuits, processes, algorithms, structures, components, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

While the principles of the disclosure have been described above in connection with specific apparatuses and methods this description is made only by way of example and not as limitation on the scope of the disclosure.

What is claimed is:

1. A method for authenticating an accessory device at a mobile computing device, the method comprising:
    receiving an indication that the accessory is coupled with a first port of the mobile computing device;
    receiving an indication that an authentication device is coupled with a second port of the mobile computing device;
    receiving a cross-transport authentication request from the authentication device via the second port;
    authenticating the second port with the authentication device, wherein the authentication grants a set of permissions for communication via the second port when the authentication is successful;
    transferring at least a subset of the set of permissions granted to the second port during the authentication to the first port; and
    thereafter, communicating with the accessory through the first port according to the transferred permissions.

2. The method according to claim 1, wherein the set of permissions permit an accessory to interoperate with the mobile computing device.

3. The method according to claim 1, wherein the communicating with the accessory includes receiving commands from the accessory.

4. The method according to claim 1, wherein the communicating with the accessory includes sending commands to the accessory.

5. The method according to claim 1, wherein the permissions are revoked when the authentication device is decoupled from the mobile computing device.

6. The method according to claim 1, wherein the permissions are revoked when the accessory is decoupled from the mobile computing device.

7. The method according to claim 1, wherein the authentication controller is physically coupled with the mobile computing device.

8. The method according to claim 1, wherein the authentication controller comprises a dongle.

9. The method according to claim 1, wherein the accessory is wirelessly coupled with the mobile computing device.

10. A mobile computing device comprising:
    a multi-transport communication interface configured to exchange commands and data with at least one accessory and an authentication controller, the multi-transport communication interface having a plurality of ports;
    control logic coupled with the multi-transport communication interface, the control logic being configured to:
        receive a request for cross-transport authentication from an authentication controller via a first port of the plurality of ports of the multi-transport communication interface, the request specifying a second port of the plurality of ports as a destination port, wherein the second port is a wireless port;
        perform an authentication operation via the first port; and
        in the event that the authentication operation is successful, grant a set of permissions to at least the second port.

11. The mobile computing device according to claim 10, wherein the first port is a physical port.

12. The mobile computing device according to claim 10, wherein the second port comprises a wireless port.

13. The mobile computing device according to claim 10, wherein the first port comprises an asynchronous serial port or a universal serial bus (USB) port.

14. The mobile computing device according to claim 10, wherein the second port comprises a port selected from the group consisting of an EDGE network port, a 3G network port, a phone network port, a FireWire port; a Wi-Fi port; and a Bluetooth port.

15. The mobile computing device according to claim 10, wherein the control logic is configured to interoperate with the accessory coupled with the second port.

16. A method for authenticating an accessory device at a mobile computing device, the method comprising:
    receiving an accessory identifier from an accessory coupled with a first port of the mobile computing device;
    receiving a cross-transport authentication request from an authentication device coupled with a second port of the mobile computing device, the cross-transport authentication request including an authentication device identifier;
    authenticating the authentication device through the second port, wherein the authentication grants a set of permissions for communication via the second port when the authentication is successful; and
    transferring at least a subset of the set of permissions granted to the second port during the authentication to the first port in the event that the accessory identifier is associated with the authentication device identifier.

17. The method according to claim 16, wherein the set of permissions granted to the second port during the authentication is transferred to the first port in the event that the accessory identifier matches the authentication device identifier.

18. The method according to claim 16, wherein the second port is a wireless port.

19. The method according to claim 16 further comprising communicating with the accessory through the first port.

20. A method for authenticating an accessory device at a mobile computing device, the method comprising:
- receiving a cross-transport authentication request from an authentication device coupled with a third port of the mobile computing device, wherein the cross-transport authentication request indicates wireless ports as destination ports;
- authenticating the authentication device through the third port, wherein the authentication grants a set of permissions for communication via the third port when the authentication is successful;
- transferring at least a subset of the set of permissions granted to the third port during the authentication to a first wireless port and a second wireless port, wherein the first wireless port is coupled with a first accessory and a second wireless port is coupled with a second accessory; and
- providing a communication path through the mobile computing device allowing the first accessory and the second accessory to communicate.

21. The method according to claim 20 further comprising communicating with the first accessory through the first port.

22. The method according to claim 20 further comprising communicating with the second accessory through the second port.

23. A dongle comprising:
- a housing;
- an input/output communication interface disposed at least partially within the housing and configured to couple with a mobile computing device; and
- an authentication controller disposed within the housing and communicatively coupled with the input/output communication interface, wherein the authentication controller is configured to communicate a cross-transport authentication request to the mobile computing device and wherein the authentication controller is configured to interact with the mobile computing device to authenticate an accessory communicatively coupled with the mobile computing device through another port.

24. The dongle according to claim 23 wherein the authentication controller is configured to cryptographically respond to messages from the mobile computing device.

* * * * *